(12) United States Patent
Haseba et al.

(10) Patent No.: US 10,558,083 B2
(45) Date of Patent: Feb. 11, 2020

(54) LIQUID CRYSTAL DISPLAY MODULE AND LIQUID CRYSTAL DISPLAY DEVICE

(71) Applicant: SHARP KABUSHIKI KAISHA, Sakai, Osaka (JP)

(72) Inventors: Yasuhiro Haseba, Sakai (JP); Shinji Shimada, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/138,820

(22) Filed: Sep. 21, 2018

(65) Prior Publication Data

US 2019/0094625 A1 Mar. 28, 2019

(30) Foreign Application Priority Data

Sep. 22, 2017 (JP) .................. 2017-182468

(51) Int. Cl.
  *G02F 1/133* (2006.01)
  *G02F 1/1335* (2006.01)
  *F21V 8/00* (2006.01)
  *G02F 1/1343* (2006.01)
  *G02F 1/139* (2006.01)

(52) U.S. Cl.
  CPC ..... *G02F 1/133617* (2013.01); *G02B 6/0066* (2013.01); *G02F 1/1393* (2013.01); *G02F 1/13439* (2013.01); *G02F 1/133512* (2013.01); *G02F 1/133516* (2013.01); *G02F 1/133528* (2013.01); *G02F 1/134309* (2013.01)

(58) Field of Classification Search
  CPC ............ G02F 1/134309; G02F 1/1393; G02F 1/133512; G02F 1/133617
  See application file for complete search history.

(56) References Cited

U.S. PATENT DOCUMENTS

| 9,651,825 | B2* | 5/2017 | Lee .................. G02F 1/133512 |
| 2016/0085118 | A1* | 3/2016 | Lee .................. G02F 1/133512 349/62 |
| 2016/0161650 | A1* | 6/2016 | Taraschi .................. G02B 5/28 349/70 |
| 2018/0329255 | A1* | 11/2018 | Zha .................. G02F 1/133528 |
| 2019/0086732 | A1* | 3/2019 | Wang ................ G02F 1/133617 |
| 2019/0101795 | A1* | 4/2019 | Tan |
| 2019/0101797 | A1* | 4/2019 | Wang ........................ G02F 1/29 |

FOREIGN PATENT DOCUMENTS

| CN | 106773314 A | 5/2017 |
| JP | 2016-071326 A | 5/2016 |

* cited by examiner

*Primary Examiner* — James A Dudek
(74) *Attorney, Agent, or Firm* — ScienBiziP, P.C.

(57) ABSTRACT

A liquid crystal display module is switchable between a blocking state and a displaying state on the basis of a change, caused by applying a voltage to the liquid crystal layer, in the orientation of liquid crystal molecules contained in the liquid crystal layer, the blocking state being a state in which transmitting light is concentrated to a blocking region on an initial optical axis, the displaying state being a state in which transmitting light is concentrated to a light-emitting region on a voltage-induced optical axis different from the initial optical axis.

22 Claims, 12 Drawing Sheets

FIG. 6
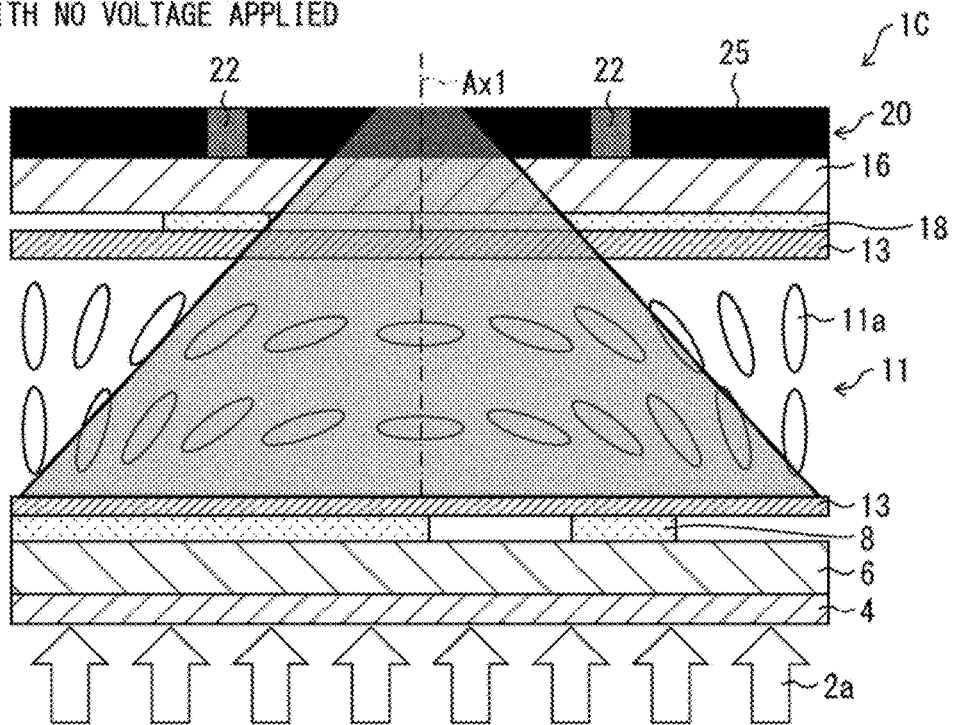
(a) WITH NO VOLTAGE APPLIED
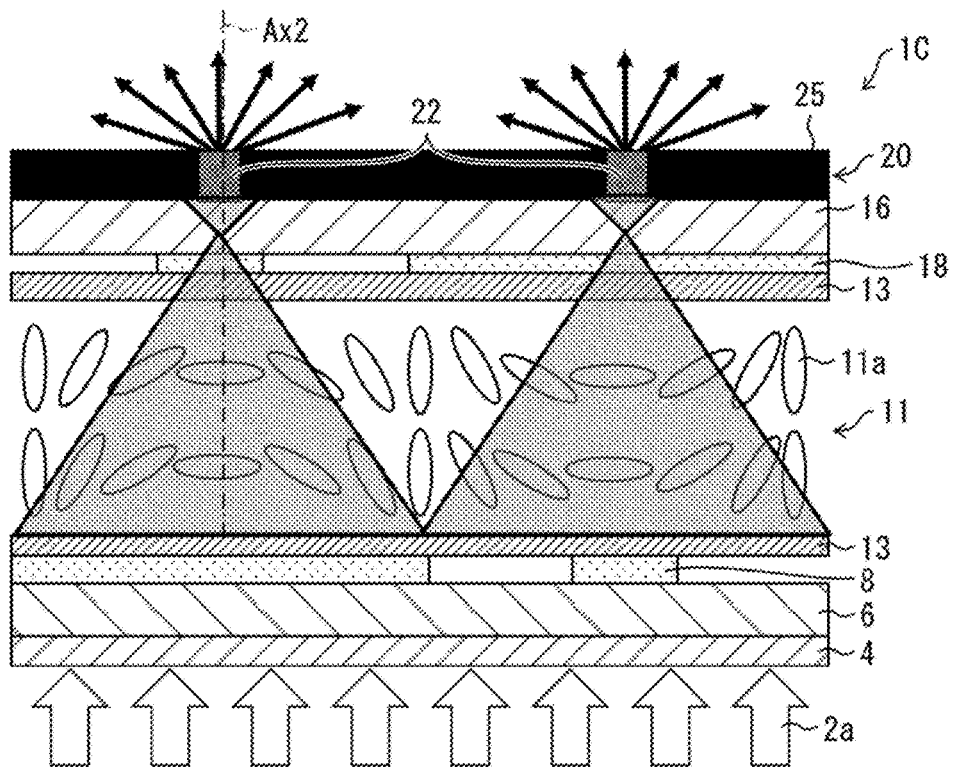
(b) WITH VOLTAGE APPLIED

FIG. 8
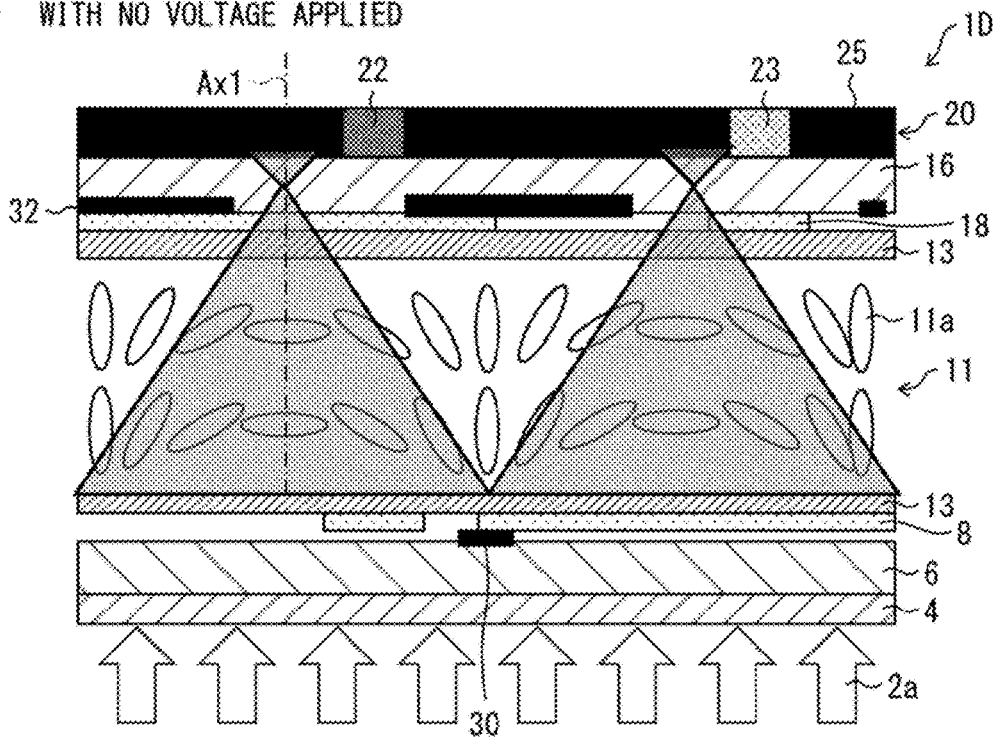
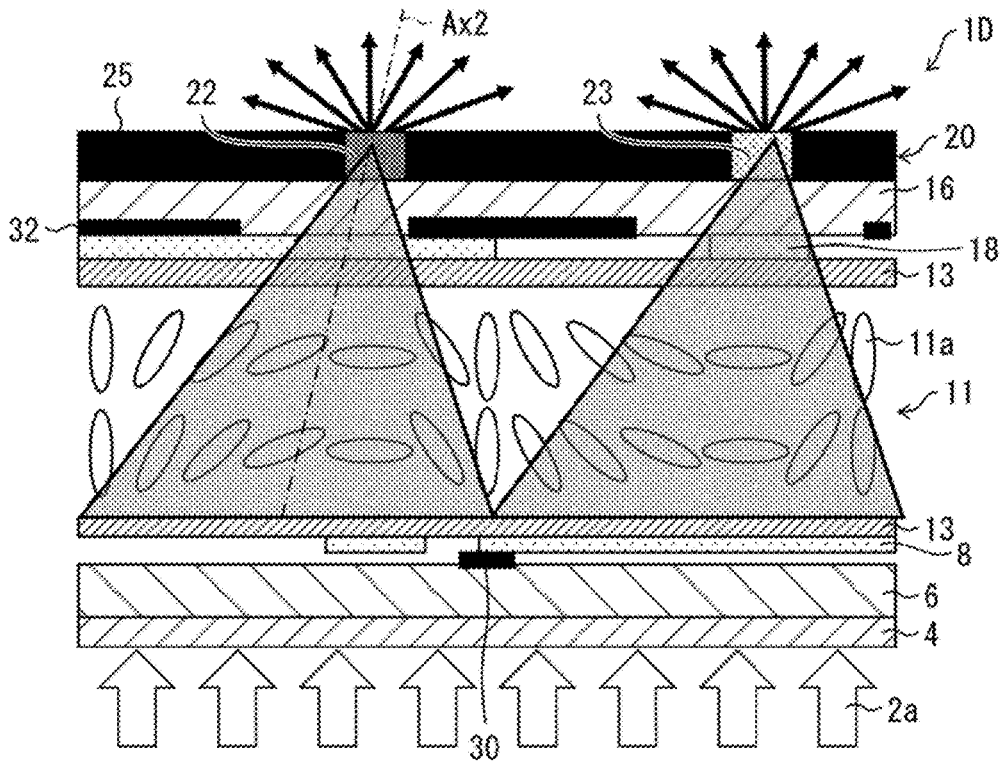

LIQUID CRYSTAL DISPLAY MODULE AND LIQUID CRYSTAL DISPLAY DEVICE

This Nonprovisional application claims priority under 35 U.S.C. § 119 on Patent Application No. 2017-182468 filed in Japan on Sep. 22, 2017, the entire contents of which are hereby incorporated by reference.

TECHNICAL FIELD

The present invention relates to a liquid crystal display device. The present invention more particularly relates to (i) a liquid crystal display module containing a wavelength conversion material having a high efficiency of converting the wavelength of light and to (ii) a liquid crystal display device including the liquid crystal display module.

BACKGROUND ART

Liquid crystal display devices have been in wide use as display devices included in various electronic apparatuses. A liquid crystal display device configured to display full-color images typically includes a color filter layer. A color filter layer partially absorbs the spectrum of white light received and lets a separated (intended) color component of the light pass therethrough.

Recent years have seen active development of techniques of using a wavelength conversion material having a high wavelength conversion efficiency such as a quantum-dot phosphor in place of a color filter layer so that a liquid crystal display device to be produced will have a better performance. With such techniques, a liquid crystal display device includes a wavelength conversion layer containing a quantum-dot phosphor (the wavelength conversion layer is referred to also as quantum-dot color filter). For instance, blue light emitted by a blue light-emitting diode (LED) is (i) converted by the wavelength conversion layer into red light or green light or is (ii) diffused by a diffusing section of the wavelength conversion layer. The wavelength conversion layer is thus used for sub-pixels of a liquid crystal display device that have the three primary colors.

A liquid crystal display device including quantum dots typically includes a polarizing plate in each cell (referred to as in-cell polarizing plate), and controls the birefringence of the liquid crystal layer with use of an electric field to control the amount of light incident on the wavelength conversion layer.

Known examples of a liquid crystal display device including quantum dots include the respective techniques disclosed in Patent Literatures 1 and 2.

CITATION LIST

Patent Literature

[Patent Literature 1]
Japanese Patent Application Publication, Tokukai, No. 2016-71326 (Publication date: May 9, 2016)
[Patent Literature 2]
Chinese Patent Application Publication No. 106773314 A (Publication Date: May 31, 2017)

SUMMARY OF INVENTION

Technical Problem

Current in-cell polarizing plates are produced through such steps as applying a dichroic pigment material to a surface to form a layer containing a dichroic pigment and (ii) attaching, to the inside of the cell, a wire grid and/or the like formed by nanoimprinting, for example.

No method has unfortunately been developed yet for mass-producing an in-cell polarizing plate having a sufficient degree of polarization. Further, the use of a polarizing plate results in the transmittance being decreased by not less than 50%. This means that in-cell polarizing plates are not practical in terms of production and quality and that a liquid crystal display device including an in-cell polarizing plate has a contrast much lower than a liquid crystal display device including no in-cell polarizing plate.

Currently, a quantum-dot phosphor, which has a high wavelength conversion efficiency, contains cadmium (Cd). A liquid crystal display device including a quantum-dot phosphor thus has the following issue: Increasing the open area ratio of the wavelength conversion layer inevitably leads to an increased amount of Cd used.

A liquid crystal display device including no quantum-dot phosphor has the following issue: Increasing the open area ratio of the wavelength conversion layer for an increased transmittance leads to a decreased contrast due to leakage of light. In other words, there has been a trade-off between (i) increasing the contrast of an image displayed by a liquid crystal display device and increasing the transmittance of light passing through the liquid crystal display device (that is, making the image bright).

An aspect of the present invention has been accomplished in view of the above issues. It is an object of an aspect of the present invention to provide (i) a liquid crystal display module that achieves both a high contrast and a high transmittance without increasing the open area ratio and (ii) a liquid crystal display device including the liquid crystal display module.

Solution to Problem

In order to attain the above object, a liquid crystal display module in accordance with an aspect of the present invention includes: a first substrate; a second substrate above the first substrate; a liquid crystal layer between the first substrate and the second substrate; a color display section above the second substrate or between the second substrate and the liquid crystal layer; and two or more electrodes for applying a voltage to the liquid crystal layer, the color display section including a blocking region and at least one light-emitting region, the blocking region being a region that blocks transmitting light entering the liquid crystal display module from below the first substrate and passing through the liquid crystal layer toward the color display section, the at least one light-emitting region being a region that converts a wavelength of the transmitting light or that lets the transmitting light pass through the at least one light-emitting region without wavelength conversion, the liquid crystal layer being switchable between a blocking state and a displaying state on a basis of a change, caused by applying the voltage to the liquid crystal layer, in an orientation of liquid crystal molecules contained in the liquid crystal layer, the blocking state being a state in which the transmitting light is concentrated to the blocking region on a first optical axis, the displaying state being a state in which the transmitting light is concentrated to the at least one light-emitting region on a second optical axis different from the first optical axis.

Advantageous Effects of Invention

An aspect of the present invention provides (i) a liquid crystal display module that achieves both a high contrast and a high transmittance without increasing the open area ratio and (a liquid crystal display device including the liquid crystal display module.

BRIEF DESCRIPTION OF DRAWINGS

FIG. 6 provides schematic cross-sectional views of a liquid crystal display module of Embodiment 3 of the present invention, where (a) illustrates the liquid crystal display module with no voltage being applied and (b) illustrates the liquid crystal display module with a voltage being applied.

FIG. 8 provides schematic cross-sectional views of a liquid crystal display module of Embodiment 4 of the present invention, where (a) illustrates the liquid crystal display module with no voltage being applied and (b) illustrates the liquid crystal display module with a voltage being applied.

DESCRIPTION OF EMBODIMENTS

Figure 1:
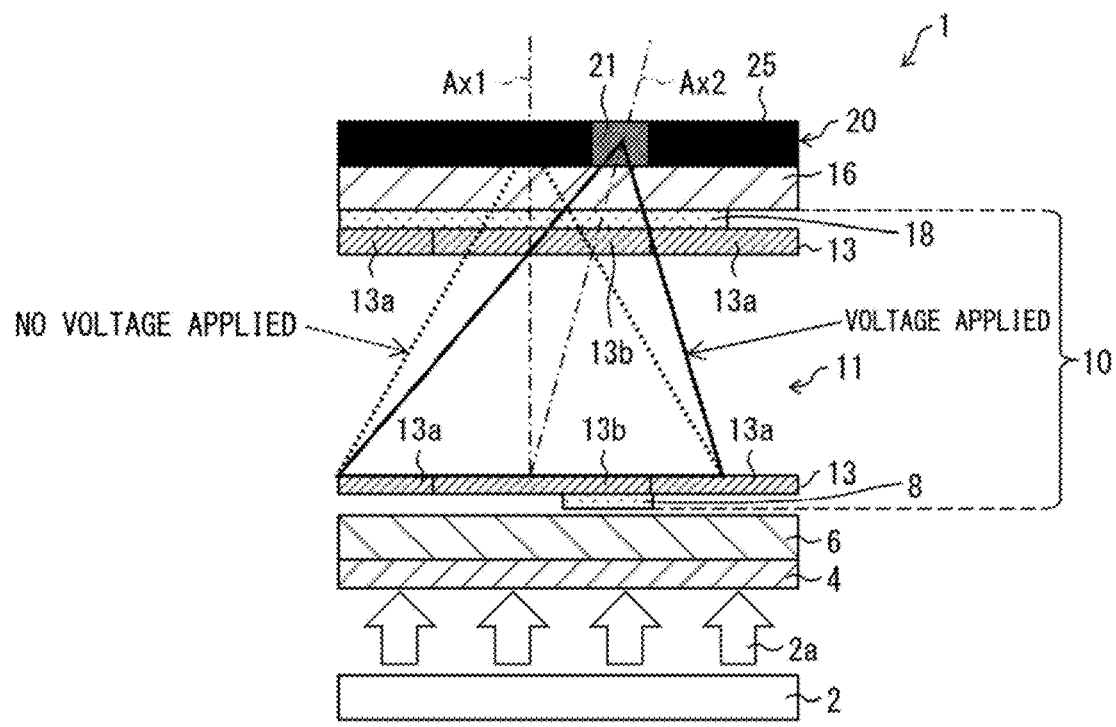
FIG. 1 is a cross-sectional view of (i) a liquid crystal display module in accordance with Embodiment 1 and (ii) a liquid crystal display device including the liquid crystal display module, the view schematically showing the respective configurations of the liquid crystal display module and the liquid crystal display device.

The description below deals with embodiments of the present invention in detail with reference to drawings. For convenience of explanation, the description below uses (i) words such as "above" and "upper" to refer to that in-plane direction of a drawing which faces the side of the drawing number, (ii) words such as "below" and "lower" to refer to that in-plane direction of a drawing which faces the side opposite to the side of the drawing number, (ii) words such as "left" to refer to the left side for the viewer of a drawing with the gravitational direction being the direction extending from above to below of the drawing, and (iv) words such as "right" to refer to the right side of the viewer of a drawing with the gravitational direction being the direction extending from above to below of the drawing. For instance, words such as "above" and "upper" in the description below indicate a direction that is not limited to vertically above unless specified as such. This applies similarly to other directions as well.

Comparative Example

Figure 12:
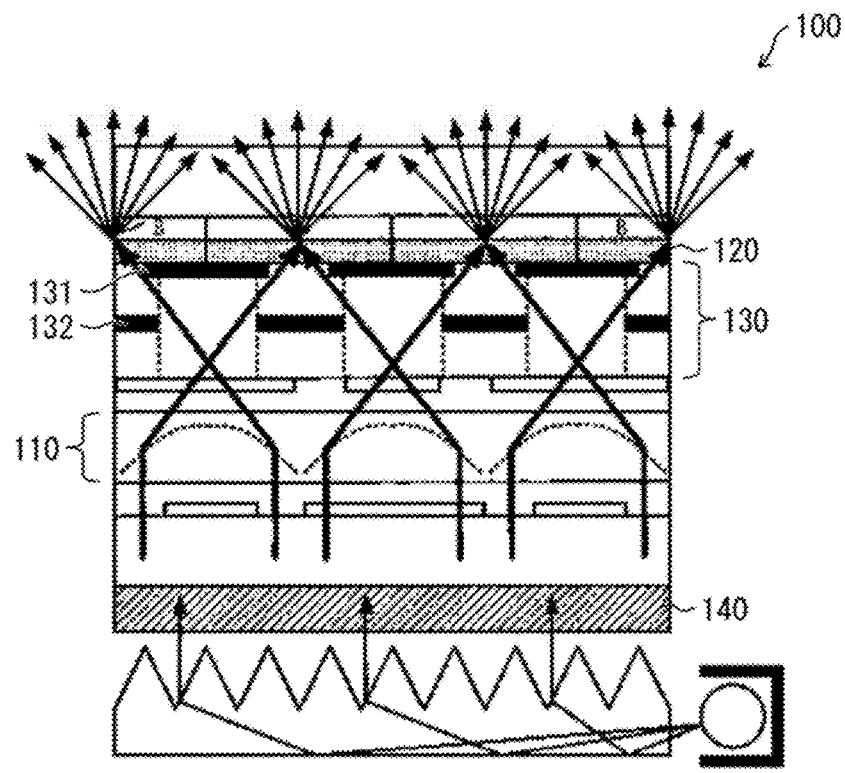
FIG. 12 is a diagram illustrating an example conventional liquid crystal display device configured to form a liquid crystal lens(es).
Figure 13:
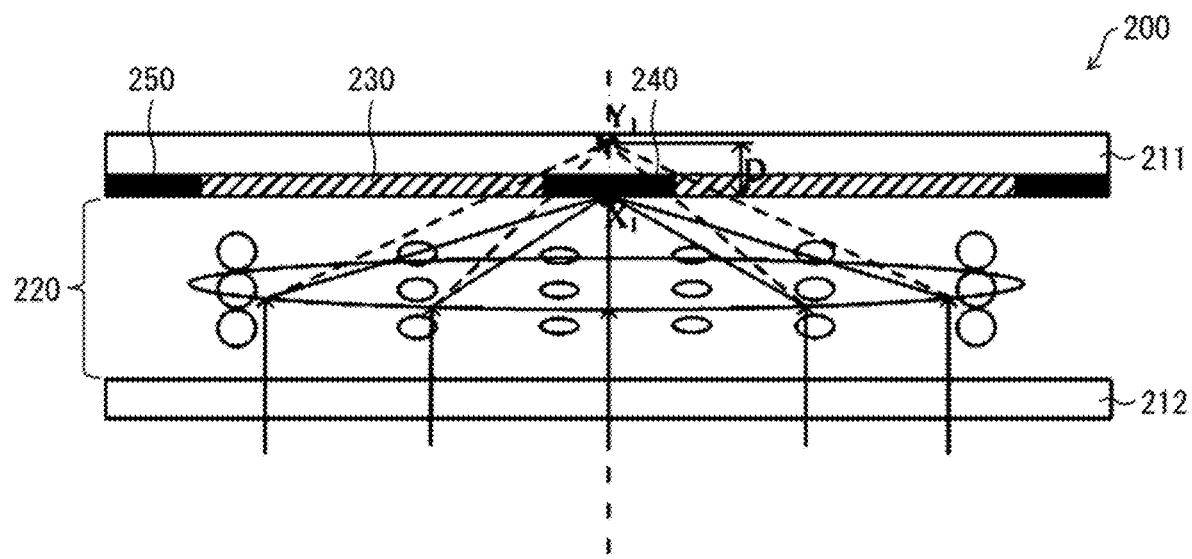
FIG. 13 is a diagram illustrating another example conventional liquid crystal display device configured to form a liquid crystal lens(es)

To facilitate understanding of a liquid crystal display device in accordance with an embodiment of the present invention, the following description will first discuss, with reference to FIGS. 12 and 13, a conventional liquid crystal display device including (i) a wavelength conversion layer (referred to also as quantum-dot layer) containing a quantum-dot phosphor and (ii) a liquid crystal lens layer, as well as an issue involved therein. FIG. 12 is a diagram illustrating a liquid crystal display device disclosed in Patent Literature 1. FIG. 13 is a diagram illustrating a liquid crystal display device disclosed in Patent Literature 2.

Patent Literature 1 discloses a technique of controlling the focal length of a liquid crystal lens on its optical axis to control the amount of light incident on a quantum-dot layer without use of an in-cell polarizing plate.

Specifically, Patent Literature 1 discloses a liquid crystal display module 100 having a structure for image display which structure includes, as illustrated in FIG. 12, a liquid crystal layer 110, a quantum-dot layer 120, and a light-blocking structure 130. The light-blocking structure 130 includes two blocking layers 131 and 132, each of which includes a plurality of blocking portions and a plurality of openings which blocking portions and openings are arranged alternately. The liquid crystal display module 100 further includes a polarizing sheet 140 below the liquid crystal layer 110.

When the display pixels are on, the liquid crystal layer 110 provides at least one liquid crystal lens for refracting blue light beams as polarized through the polarizing sheet 140, and the beams thus refracted pass through the openings of the light-blocking structure 130 to reach the quantum-dot layer 120. When the display pixels are off, blue light beams are not refracted and are blocked by the light-blocking structure 130.

Patent Literature 2 discloses a similar technique of controlling the focal length of a liquid crystal lens on its optical axis to switch display pixels between the ON and OFF states without use of an in-cell polarizing plate.

Specifically, Patent Literature 2 discloses a liquid crystal display device 200 having a structure for image display which structure includes, as illustrated in FIG. 13, a pair of substrates 211 and 212, a liquid crystal layer 220 sandwiched between the substrates 211 and 212, a quantum-dot layer 230, a central light-blocking region 240, and an outer light-blocking region 250. The quantum-dot layer 230 is in the shape of a ring present between the central light-blocking region 240 and the outer light-blocking region 250. Light beams as polarized through a polarizing sheet (not shown) enter the liquid crystal display device 200.

When the display pixels are off, the liquid crystal layer 220 provides a liquid crystal lens having a focal point in the central light-blocking region 240. Light beams as refracted through the liquid crystal lens are blocked by the central light-blocking region 240. When the display pixels are on, the liquid crystal lens has a focal point above the central light-blocking region 240. This causes light beams as refracted through the liquid crystal lens to partially reach the quantum-dot layer 230.

Techniques such as the above involve no use of an in-cell polarizing plate, and instead use a liquid crystal lens provided by a liquid crystal layer to refract light beams for switching display pixels between the ON and OFF states.

Either of the above techniques, when the display pixels are on (that is, in a color display state), unfortunately lets a blocking layer absorb part of light as refracted through a liquid crystal lens. This results in a decrease in the amount of light incident on the quantum-dot layer, indicating an inefficient use of light.

Increasing the contrast of a liquid crystal display device including a liquid crystal lens and a quantum-dot phosphor involves satisfying the requirements listed below.

(a) Low open area ratio (to reduce (i) leakage of stray light and (ii) light emission by the quantum-dot phosphor due to external light)

(b) High efficiency of blocking backlight when the display pixels are off (that is, in a black display state)

(c) High efficiency of backlight entering the quantum-dot layer when the display pixels are on (in a color display state)

To satisfy requirement (b) above, the technique disclosed in Patent Literature 2 may be configured such that the focal length is equivalent to the cell thickness or that the central light-blocking region 240 is wider. Achieving a focal length equivalent to the cell thickness (approximately 3 μm) involves (i) using a liquid crystal material having a particularly large Δn or (ii) causing a liquid crystal lens to have a particularly small aperture. Such measures are difficult to take. Using a liquid crystal material having a large Δn involves the concern of a longer response time or lower reliability. Causing a liquid crystal lens to have a particularly small aperture will increase the proportion of the area of wiring or the like, with the result of lower transmittance in a white display state.

Increasing the cell thickness will cause the liquid crystal to have a longer response time. This is because normally, the response time of a liquid crystal is proportional to the square of the cell thickness. Widening the central light-blocking region will leave requirement (c) above unsatisfied.

The technique disclosed in Patent Literature 2 is configured to change the focal length of a liquid crystal lens to switch display pixels between the ON and OFF states. Thus, reducing the area of the quantum-dot layer 230 for a lower open area ratio to satisfy requirement (a) above will increase the overall proportion of the area of the light-blocking region, with the result of lower transmittance.

In other words, while the technique disclosed in Patent Literature 2 (which involves no use of an in-cell polarizing plate) can increase the contrast, it fails to solve the issue of the trade-off between (i) the contrast of a displayed image and (ii) the response time, transmittance, reliability, and driving voltage.

The inventors of the present invention conducted diligent research to solve the issue of the trade-off between contrast and transmittance to produce a liquid crystal display device including a wavelength conversion material which liquid crystal display device has a better performance. As a result, the inventors conceived of, as a breakthrough to the above issue, a new means of switching display pixels between the ON and OFF states for a liquid crystal display device and thereby arrived at a liquid crystal display module of the present disclosure and a liquid crystal display device including the liquid crystal display module.

Embodiment 1

The following description will discuss an embodiment of the present invention in detail.

A liquid crystal display module in accordance with an aspect of the present disclosure and a liquid crystal display device including the liquid crystal display module each include a liquid crystal layer having the function as a liquid crystal lens and are each configured to switch display pixels between the ON and OFF states in response to an electric field applied to the liquid crystal layer. The liquid crystal display module and the liquid crystal display device may each be included in, for example, a television or a mobile information terminal.

Schematic Configuration of Liquid Crystal Display Module 1

First, to facilitate understanding of how a liquid crystal display module of the present disclosure switches display pixels between the ON and OFF states, the description below outlines the basic configuration of a liquid crystal display module 1 as an example liquid crystal display module of the present disclosure with reference to FIGS. 1 and 2. FIG. 1 is a cross-sectional view of (i) a liquid crystal display module 1 in accordance with the present embodiment and (ii) a liquid crystal display device including the liquid crystal display module 1, the view schematically showing the respective configurations of the liquid crystal display module 1 and the liquid crystal display device.

As illustrated in FIG. 1, the liquid crystal display module 1 in accordance with the present embodiment includes a polarizing sheet (polarizing layer) 4, a lower substrate (first substrate) 6, a light concentrating section 10, an upper substrate (second substrate) 16, and a color display layer (color display section) 20, which are arranged in this order from below to above. FIG. 1 illustrates a liquid crystal display device including a combination of the liquid crystal display module 1 and a backlight unit (light source section) 2.

The light concentrating section 10 includes a liquid crystal layer 11, a pair of alignment films (alignment layers) 13 sandwiching the liquid crystal layer 11, a lower electrode 8 disposed below the lower one of the alignment films 13, and an upper electrode 18 disposed above the upper one of the alignment films 13. The color display layer 20 has (i) a light-emitting region 21 that converts the wavelength of incident light before the light passes therethrough or that lets incident light pass therethrough without wavelength conversion and (ii) a blocking region 25 that blocks light. These sections are outlined below, and will be detailed later.

The backlight unit 2 emits backlight 2a from below the liquid crystal display module 1 to above (that is, toward the display-surface side).

The polarizing sheet 4 is a polarizing element (polarizer) having a transmission axis in a predetermined direction to produce linearly polarized light. The polarizing sheet 4 is a polarizing element designed in view of the wavelength of backlight 2a. The polarizing sheet 4 receives backlight 2a and lets only a linearly polarized component of the backlight 2a pass therethrough.

The lower substrate 6 and the upper substrate 16 are each light-transmitting in order to let light travel outward from the liquid crystal display module 1.

The color display layer 20, which is disposed above the upper substrate 16, has a blocking region 25 (which accounts for the majority of the color display layer 20) and a light-emitting region 21. The blocking region 25 is not light-transmitting, and blocks light. The light-emitting region 21, for example, includes a transparent resin and a phosphor dispersed therein, or lets incident light pass therethrough. The light-emitting region 21 may have a diffusion layer for diffusing light.

The phosphor contained in the light-emitting region 21 is excited by incident light to emit light (fluorescence) having a wavelength longer than the wavelength of the incident light. The phosphor is, for example, a quantum-dot phosphor.

The light concentrating section 10 is configured such that the liquid crystal layer 11 functions as a liquid crystal lens to concentrate light passing through the liquid crystal layer 11. The liquid crystal layer 11 contains liquid crystal molecules aligned with use of the alignment films 13 and thereby functions as a liquid crystal lens(es). Applying a voltage to the liquid crystal layer 11 with use of the lower electrode 8 and the upper electrode 18 changes the optical axis of the liquid crystal lens(es). The liquid crystal lens(es) may be regarded as a virtual optical lens (virtual lens).

Figure 2:
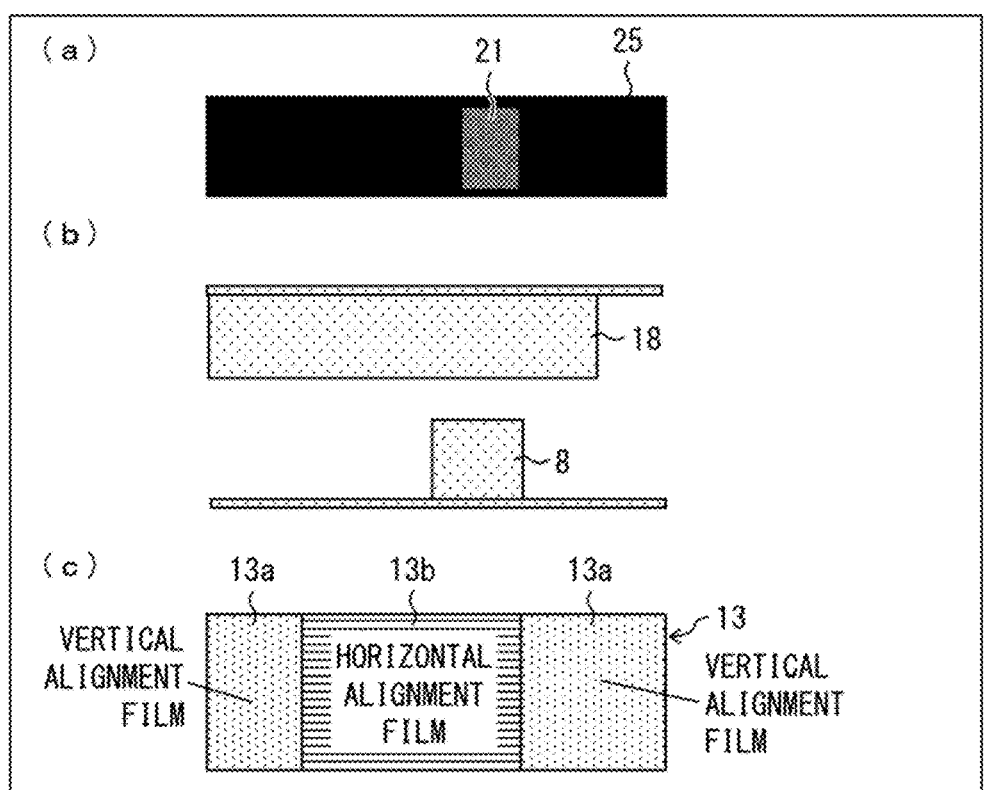
FIG. 2 provides diagrams schematically illustrating the respective configurations of components of the liquid crystal display module, where (a) is a plan view of a color display layer, (b) is a cross-sectional view of an upper electrode and a lower electrode, and (c) is a plan view of an alignment film.

The following description will discuss the light concentrating section 10 with reference to FIG. 2. FIG. 2 provides diagrams schematically illustrating the respective configurations of components of the liquid crystal display module 1, where (a) is a plan view of the color display layer 20, (b) is a cross-sectional view of the upper electrode 18 and the lower electrode 8, and (c) is a plan view of an alignment film 13. In any cross-sectional view of the liquid crystal display device or a component(s) thereof, the left-right direction indicates the horizontal direction, and the direction orthogonal to the horizontal direction is the vertical direction. This applies similarly to the description below of the present specification as well.

As illustrated in FIG. 2, the alignment films 13 each include vertical alignment films (first alignment layers) 13a and a horizontal alignment film (second alignment layer) 13b, which are arranged alternately. In other words, the vertical alignment films 13a sandwich the horizontal alignment film. 13b in the left-right direction. Such an alignment film 13 may be produced by a publicly known technique such as mask rubbing and photo-alignment. An alignment film 13 may be produced by, for example, a method including a step of irradiating, with ultraviolet light through a mask, a known alignment film that (i) aligns liquid crystal molecules vertically before being irradiated with ultraviolet light and that (ii) aligns liquid crystal molecules horizontally after being irradiated with ultraviolet light.

The liquid crystal layer 11 which is sandwiched between such alignment films 13, contains liquid crystal molecules aligned as follows in the initial state (that is, when no voltage is being applied): At that portion of the liquid crystal layer 11 which is sandwiched between the horizontal alignment films 13b and which corresponds to a central portion of each horizontal alignment film 13b, liquid crystal molecules each have a horizontal director. At that portion of the liquid crystal layer 11 which is sandwiched between two vertical alignment films 13a, liquid crystal molecules each have a vertical director. The respective directors of liquid crystal molecules vary from horizontal to vertical toward each vertical alignment film 13a from the center of each horizontal alignment film 13b. This allows the liquid crystal layer 11 to have liquid crystal molecules in a predetermined alignment and to thereby function as a liquid crystal lens(es).

The liquid crystal layer 11 provides a liquid crystal lens(es) having an initial optical axis (first optical axis) Ax1 extending upward from a central portion of the lower horizontal alignment film 13b when no voltage is being applied to the liquid crystal layer 11 by the lower electrode 8 and the upper electrode 18. In this state, light concentrated by the liquid crystal layer 11 (shown in FIG. 1 with dotted lines indicated with "NO VOLTAGE APPLIED") reaches the blocking region 25, so that the liquid crystal display module 1 is in a blocking state, that is, the liquid crystal display module 1 does not let light travel outward therefrom. The blocking state may be rephrased as a state in which the display pixels are off.

The present embodiment assumes that the liquid crystal layer 11 contains liquid crystal molecules having a negative dielectric anisotropy. The lower electrode 8 is smaller in area than the upper electrode 18, and is directly below the light-emitting region 21. The lower electrode 8 may be shaped such that when the liquid crystal display module is viewed from above, the light-emitting region 21 is entirely inside the lower electrode 8.

When a voltage is applied to the liquid crystal layer 11 with use of the lower electrode 8 and the upper electrode 18, an electric field is generated between the lower electrode 8 and the upper electrode 18, the electric field being most intense at a position vertically above the lower electrode 8. This causes liquid crystal molecules at such a position to each have a horizontal director. This in turn causes the liquid crystal layer 11 to provide a liquid crystal lens(es) having a voltage-induced optical axis (second optical axis) Ax2 extending from a central portion of the lower horizontal alignment film 13b toward the light-emitting region 21. In this state, light concentrated by the liquid crystal layer 11 (shown in FIG. 1 with solid lines indicated with "VOLTAGE APPLIED") reaches the light-emitting region 21, so that the liquid crystal display module 1 is in a displaying state, that is, the liquid crystal display module 1 lets light travel outward therefrom. The displaying state may be rephrased as a state in which the display pixels are on.

As described above, the liquid crystal display module 1 in accordance with the present embodiment is configured such that the liquid crystal molecules contained in the liquid crystal layer 11 are oriented differently in response to voltage application. This configuration allows the optical axis of the liquid crystal lens(es) to change from the initial optical axis Ax1 to the voltage-induced optical axis Ax2, thereby making it possible to switch between (i) a state in which light having passed through the liquid crystal layer 11 is concentrated to the blocking region 25 (that is, the blocking state) and a state in which light having passed through the liquid crystal layer 11 is concentrated to the light-emitting region 21 (that is, the displaying state). The above configuration thus achieves the following advantage:

Conventional liquid crystal display devices including a quantum-dot layer and a liquid crystal lens layer change the focal point of the liquid crystal lens(es) on its optical axis to switch display pixels between the ON and OFF states. This configuration, as described above, involves the issue of a trade-off between contrast and transmittance.

The liquid crystal display module 1 in accordance with the present embodiment is, in contrast, configured to change the direction of the optical axis of the liquid crystal lens that is, to move the focal point to a position off the initial optical axis Ax1. This configuration allows for a higher efficiency of blocking light in the blocking state and a higher efficiency of causing light to enter the light-emitting region in the displaying state. The above configuration also allows the light-emitting region 21 to have a relatively small open area ratio. This makes it possible to achieve both a high contrast and a high transmittance without increasing the open area ratio.

Specific example of liquid crystal display module

Figure 3:
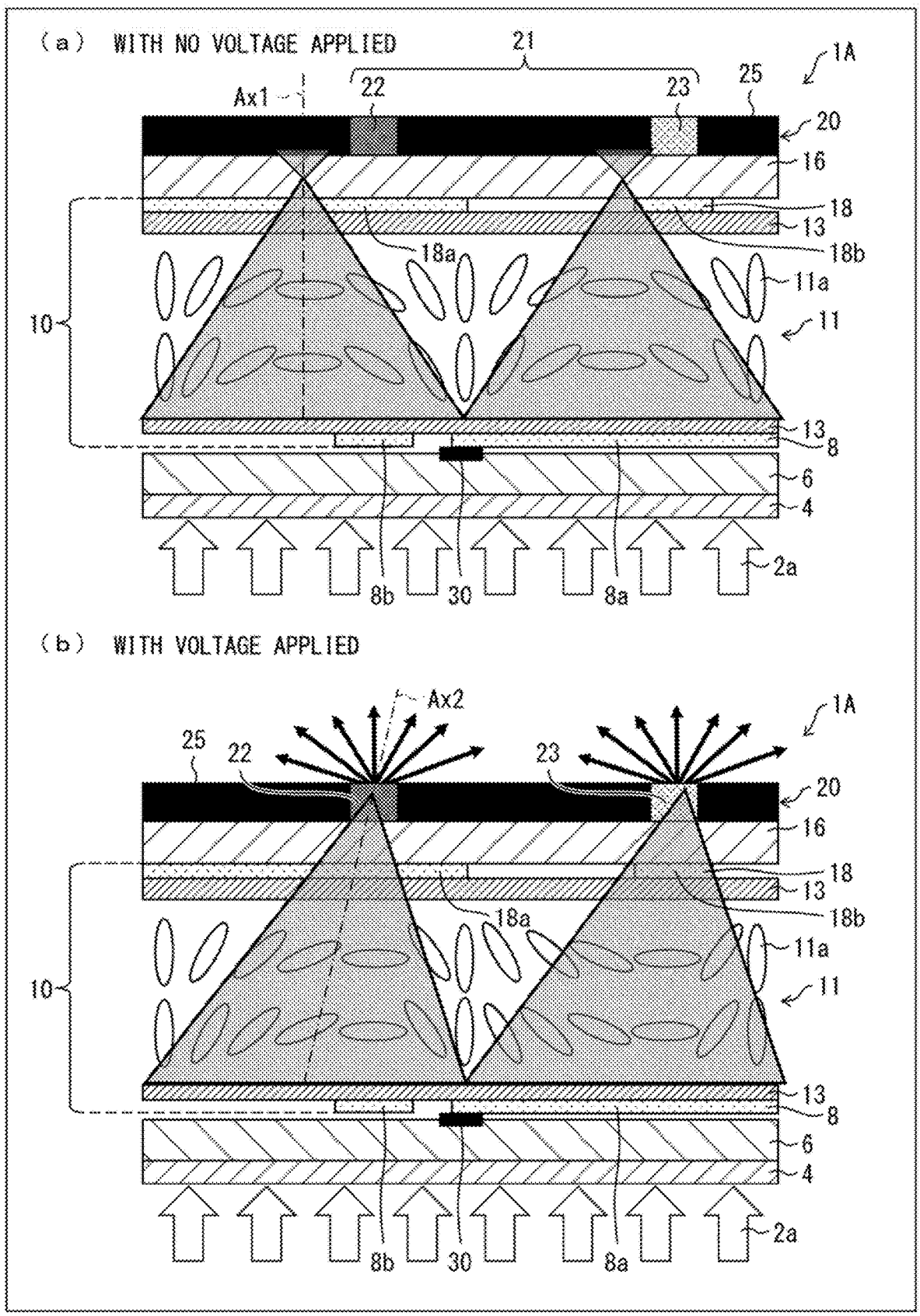
FIG. 3 provides cross-sectional views of a specific example of the liquid crystal display module, where illustrates the example liquid crystal display module with no voltage being applied and (b) illustrates the example liquid crystal display module with a voltage being applied.

The following description will discuss, with reference to FIG. 3, how a specific example of the liquid crystal display module 1 in accordance with the present embodiment is configured. FIG. 3 provides cross-sectional views of the liquid crystal display module 1A as a specific example, where (a) illustrates the liquid crystal display module 1A with no voltage being applied and (b) illustrates the liquid crystal display module 1A with a voltage being applied. FIG. 3 shows lines indicative of how light is concentrated which lines do not reflect refraction at the interface between components. This applies similarly to the description below of the present specification as well.

As illustrated in FIG. 3, the liquid crystal display module 1A in accordance with the present embodiment includes a polarizing sheet 4, a lower substrate 6, a light concentrating section 10, an upper substrate 16, and a color display layer 20, similarly to the liquid crystal display module 1 described above. The liquid crystal display module 1A further includes a lower blocking section 30 between the lower substrate 6 and the lower electrode 8. The color display layer 20 has a red conversion region 22 and a green conversion region 23 each as a specific example of the light-emitting region 21. The liquid crystal display module 1A also includes a pair of a lower electrode 8 and an upper electrode 18 in correspondence with the red conversion region 22 (that is, a light-emitting region 21) and another pair of a lower electrode 8 and an upper electrode 18 in correspondence with the green conversion region 23 (that is, a light-emitting region 21).

Although FIG. 3 omits a backlight unit 2, a liquid crystal display module in accordance with an aspect of the present invention may be combined with a backlight unit 2 to provide a liquid crystal display device. This applies similarly to the description below of the present specification as well (although not repeated in the description below).

Backlight

The polarizing sheet 4, included at a lowest portion of the liquid crystal display module 1A, receives backlight 2a, which is, for example, blue light emitted by a blue light-emitting element and having a peak wavelength of 450 nm. The backlight 2a may alternatively be near-ultraviolet light or ultraviolet light. The backlight 2a may further alternatively be red light, near-red light, or infrared light. The backlight 2a has a wavelength that may be selected depending on the wavelength conversion property of the wavelength conversion material contained in each light-emitting region 21 of the color display layer 20.

The backlight 2a preferably strikes the lower surface of the polarizing sheet 4 perpendicularly, that is, the backlight 2a is preferably parallel light. This allows a liquid crystal lens(es) (described later) to concentrate light more efficiently. The backlight 2a may be adjusted into parallel light by any publicly known approach. There is no particular limit to specifically how to adjust backlight 2a into parallel light. The backlight 2a may, for example, be adjusted into parallel light with use of a lens configured to collimate light (see Yi-Jun Wang et al., The Society for Information Display Symp. Digest, 2012, pp. 1305 to 1308 or Tun-Chien Teng et al., OPTICS EXPRESS, 2013, Vol. 21, No. 18, 21444 to 21455).

The backlight 2a is preferably monochromatic light. The backlight unit 2 may, for instance, include LEDs each configured to emit light having a spectrum with a small half width (see David Wyatt et al., The Society for Information Display Symp. Digest, 2017, pp. 992 to 995). This configuration reduces the influence of chromatic aberration and/or the like while concentrating light with use of a liquid crystal lens(es). This in turn facilitates optical design by a designer.

The backlight 2a is thus preferably parallel, monochromatic light. The description below of the present specification assumes that the backlight 2a is parallel, monochromatic light.

The backlight unit 2, configured to emit backlight 2a, is not particularly limited in detailed configuration, and may have any of various configurations selected as appropriate.

Polarizing Sheet

The polarizing sheet 4 is not limited to any particular form (for example, type). The polarizing sheet 4 may be, for example, (i) a wire-grid type polarizer having a fine metal grid in a slit shape or (ii) an absorbing polarizer such as a sheet-shaped resin polarizer. The polarizing sheet 4 may alternatively be a type of polarizer other than the above.

The polarizing sheet 4 has a transmission axis in a direction selected to allow the liquid crystal layer 11 to function as a liquid crystal lens(es). The direction of the transmission axis, in other words, may be selected to correspond to the arrangement of liquid crystal molecules of the liquid crystal layer 11. In the example illustrated in FIG. 3, the polarizing sheet 4 has a transmission axis in the left-right direction (that is, the direction parallel both to the opposite surfaces of the lower substrate 6 and to the surface of FIG. 3).

In the example illustrated in FIG. 3, the polarizing sheet 4 is immediately below the lower substrate 6. The position of the polarizing sheet 4 is, however, not limited to this. The polarizing sheet 4 may be disposed below the light concentrating section 10. The polarizing sheet 4 may alternatively be disposed between the liquid crystal layer 11 and the color display layer 20.

Substrates

The lower substrate 6 and the upper substrate 16 are each, for example, a glass substrate or a plastic substrate. The lower substrate 6 and the upper substrate 16 may alternatively each be an array substrate or a flexible substrate. The lower substrate 6 and the upper substrate 16 are not particularly limited in detailed configuration. The lower substrate 6 and the upper substrate 16 may be made of respective materials different from each other.

Electrodes

The liquid crystal display module 1A in accordance with the present embodiment includes two lower electrodes 8 and two upper electrodes 18. Specifically, the liquid crystal display module 1A includes a pair of a lower electrode 8 and an upper electrode 18 in correspondence with each of the red conversion region 22 and the green conversion region 23 (that is, for each light-emitting region 21).

The lower electrodes 8 and the upper electrodes 18 are each a transparent electrode made of, for example, indium tin oxide (ITO). One of the lower electrode 8 and the upper electrode 18 of each pair is disposed directly below a light-emitting region 21 and is smaller in area than the other. The lower electrodes 8 and the upper electrodes 18 apply a voltage to the liquid crystal layer 11 to change how the liquid crystal molecules contained in the liquid crystal layer 11 are oriented.

As the liquid crystal display module 1A has an active-matrix drive system, the lower substrate 6 is an array substrate, which is provided with switching elements each including a thin-film transistor (TFT). The upper electrodes 18 are integral with an upper electrode line as a common electrode, and are each an extension (comb tooth) of a base of the upper electrode line which extension is in the shape of a comb tooth (see a description below of Embodiment 3 referring to (b) of FIG. 7). In a cross section as illustrated in FIG. 3, one of the two upper electrodes 18 is a relatively large first extension (first upper electrode) 18a, whereas the other of the two upper electrodes 18 is a second extension (second upper electrode) 18b smaller than the first extension 18a. The array substrate as the lower substrate 6 includes electrodes (address lines) each for transmitting an address signal and electrodes (data lines) each for transmitting a data signal, the address lines and the data lines crossing each other. The lower electrodes 8 are each a pixel electrode connected to a data line and an address line via a TFT. In a cross section as illustrated in FIG. 3, one of the two lower electrodes 8 is a relatively large first pixel electrode 8a, whereas the other of the two lower electrodes 18 is a second pixel electrode (second lower electrode) 18b smaller than the first pixel electrode 8a.

The liquid crystal display module 1A in accordance with the present embodiment is configured such that the first extension 18a and the second pixel electrode 8b correspond to the red conversion region 22 and that the second extension 18b and the first pixel electrode 8a correspond to the green conversion region 23.

The liquid crystal display module 1A may alternatively have a passive matrix drive system. In this case, the liquid crystal display module 1A may be configured such that the lower electrodes 8 are each an electrode for an address signal and that the upper electrodes 18 are each an electrode for a data signal.

The liquid crystal display module 1A includes other electrodes (bus lines) as well (not shown).

The liquid crystal display module 1A is configured such that the left side of FIG. 3 is a red region corresponding to the red conversion region 22, whereas the right side of FIG. 3 is a green region corresponding to the green conversion region 23. In the red region, the corresponding lower electrode 8 (second pixel electrode 8b) is smaller in area than the corresponding upper electrode 18 (first extension 18a). In the green region, the corresponding upper electrode (second extension 18b) is smaller in area than the corresponding lower electrode 8 (first pixel electrode 8a). A later description will deal with how the lower electrodes 8 and the upper electrodes 18 are shaped and how the liquid crystal display module 1A operates in response to voltage application.

Color Display Layer

The liquid crystal display module 1A includes a color display layer 20 having a red conversion region 22 and a green conversion region 23 each as a light-emitting region 21. The light-emitting region 21 contains a phosphor as a wavelength conversion material having a high efficiency of converting the wavelength of light. The light-emitting region may, for instance, include a phosphor dispersed in a medium. The medium is not limited to any particular one, and may be any medium that allows excitation light and fluorescence to pass therethrough. The medium is, for example, resin or glass. The medium may contain a light-scattering agent for a more efficient use of light. This allows the optical path length to be longer in the light-emitting region 21 within the limits of the thickness and phosphor concentration of the light-emitting region 21, thereby making it possible to excite the phosphor efficiently.

The light-emitting region 21 has a shape that may be adjusted depending on the shape of the liquid crystal lens(es) virtually formed at the liquid crystal layer 11. In a case where, for instance, the liquid crystal lens has a substantially semicircular shape in the cross section illustrated in FIG. 3, the light-emitting region 21 may have a rectangular shape in a plan view. The light-emitting region may have any shape that is suitable for controlling switching of display pixels between the ON and OFF state. The shape is thus not limited to any particular one, and may be a shape other than a rectangle.

The light-emitting region 21 may, for instance, receive blue light and emit (i) red light, green light, or (iii) blue light having a wavelength longer than the wavelength of the incident blue light. The light-emitting region 21 may alternatively be (i) a transmitting region that allows incident light (for example, blue light) to pass therethrough or (ii) diffusion layer that diffuses light (not shown in FIG. 3). This configuration allows incident light to be used directly for image display. The color display layer 20 is used for sub-pixels having the three primary colors of red, green, and blue (RGB).

The red conversion region 22 may, as a specific example, contain a nitride phosphor (referred to as CASN) whose basic composition is $CaAlSiN_3$:Eu, a fluoride phosphor (referred to as KSF), and/or the like as a red phosphor. The green conversion region 23 may contain a SiAlON-based phosphor and/or the like as a green phosphor.

The light-emitting region 21 preferably contains a quantum-dot phosphor as its phosphor. For instance, the red conversion region 22 and the green conversion region 23 may each contain a quantum-dot phosphor having a desired light emission property. A quantum-dot phosphor is made up of extremely small nanocrystals each having a diameter of several nanometers to several tens of nanometers. A quantum-dot phosphor converts the wavelength of incident light to emit fluorescence. The quantum-dot phosphor contained in the light-emitting region 21 may typically be made up of core-shell crystals. A quantum-dot phosphor has a larger optical band gap in a case where the quantum-dot phosphor has a smaller crystal size (quantum size effect). The peak wavelength of fluorescence of a quantum-dot phosphor may be adjusted with use of the quantum size effect. Further, finely controlling the crystal size to narrow the size distribution can narrow the half width of the spectrum of the fluorescence. This allows monochromatic light having a particular purity to be generated.

A quantum-dot phosphor typically has a high quantum yield (for example, not less than 90%) and thus has a high wavelength conversion efficiency. The phosphor contained in the light-emitting region 21 is, however, not limited to a quantum-dot phosphor as a phosphor having a high wavelength conversion efficiency. The light-emitting region 21 may alternatively contain rod-shaped crystals (quantum rods). The light-emitting region 21 may alternatively contain a phosphor made up of nanocrystals each having a crystal size larger than that for a quantum-dot phosphor.

The light-emitting region 21 may contain as its phosphor a down-conversion material such as the above or an up-conversion material. In a case where the light-emitting region 21 contains an up-conversion material, the light-emitting region 21 emits light having a wavelength shorter than that of light having entered the light-emitting region 21. Thus, the backlight 2a may be, for example, red light or infrared light.

In the example illustrated in FIG. 3, the color display layer 20 is immediately above the upper substrate 16. The position of the color display layer 20 is, however, not limited to this. The color display layer 20 may alternatively be disposed immediately below the upper substrate 16. In this case, the color display layer 20 is preferably separated from the liquid crystal layer by a light-transmitting dielectric. The color display layer 20 may further alternatively be disposed immediately below the liquid crystal layer 11.

The liquid crystal display module 1A may further include a color filter layer (not shown) immediately above the color display layer 20. This can reduce light emission by the light-emitting region 21 which light emission is due to external light and/or improve the color gamut and contrast. The liquid crystal display module 1A may further include a substrate immediately above the color display layer 20. Such a substrate can protect the color display layer 20 and thereby improve the durability of the color display layer 20.

The liquid crystal display module 1A may further include, immediately below the color display layer 20, a reflective layer (not shown) that allows the backlight 2a to pass therethrough and that reflects light emitted from the color display layer 20. This makes it possible to guide, to the outside, that portion of light emitted from the color display layer 20 which will travel back toward the liquid crystal layer 11. This can improve the efficiency of light use. The reflective layer is, for example, a short wavelength pass filter (see, for example, HYO-JUN KIM, OPTICS EXPESS, 2017, Vol. 25, No. 10, 10724 to 10734).

Lower Blocking Section

The lower blocking section 30 is disposed between the lower substrate 6 and the lower electrode 8, and blocks light in a region in which the liquid crystal layer 11 does not function as a liquid crystal lens(es). The lower blocking section 30, in other words, blocks at least a portion of light that has passed through the polarizing sheet 4 and the lower substrate 6 and that does not contribute to light concentration by the light concentrating section 10. The lower blocking section 30 is not an essential element, and is used as necessary. The lower blocking section 30 may be disposed at any position immediately below the liquid crystal layer 11. The position of the lower blocking section 30 is not limited to any particular one. The lower blocking section 30 is, for example, disposed directly below a central portion of a vertical alignment film 13a of the upper alignment film 13.

Light Concentrating Section

The following description will discuss, with reference to (a) and (b) of FIG. 3, how the light concentrating section 10 operates and how the liquid crystal display module 1A operates in response to voltage application.

The alignment films 13 induce the liquid crystal molecules contained in the liquid crystal layer 11 to be so arranged as to form a liquid crystal lens(es) The alignment filters 13 each include vertical alignment films 13a and a horizontal alignment film 13b arranged alternately as described above with respect to FIG. 2. This causes the liquid crystal molecules 11a contained in the liquid crystal layer 11 to be aligned as illustrated in FIG. 3.

FIG. 3 does not show the vertical alignment films 13a and the horizontal alignment film 13b separately from each other, and simply shows the combination as an alignment film 13. The alignment films 13 each include vertical alignment films 13a and a horizontal alignment film 13b in such a manner that the liquid crystal molecules 11a are aligned as illustrated in FIG. 3 when no voltage is being applied to the liquid crystal layer 11. The alignment films 13, in other words, cause the liquid crystal molecules 11a contained in the liquid crystal layer 11 to be aligned in the initial state. The initial state (standard state) refers to how the liquid crystal molecules 11a of the liquid crystal layer 11 are aligned when no voltage is being applied to the liquid crystal layer 11.

Specifically, at a central portion of a region sandwiched between two opposing vertical alignment films 13a, liquid crystal molecules 11a each have a vertical director (that is, the up-down direction of the drawing), whereas at a central portion of a region sandwiched between two opposing horizontal alignment films 13b, liquid crystal molecules 11a each have a horizontal director (that is, the left-right direction of the drawing). The respective directors of liquid crystal molecules 11a vary from vertical to horizontal from a central portion of each vertical alignment film 13a toward each horizontal alignment film 13b.

The liquid crystal layer 11 provides a liquid crystal lens(es) in accordance with how the liquid crystal molecules 11a are oriented. The liquid crystal layer 11, in other words, functions as a liquid crystal lens(es) for incident light. The virtual lens provided by the liquid crystal layer 11 has a shape (that is, the shape of the lens based on the assumption that the liquid crystal lens(es) is a normal lens) that is not necessarily a hemisphere and that may alternatively be substantially semicircular.

The liquid crystal molecules 11a illustrated in FIG. 3 are rod-shaped molecules of a nematic liquid crystal having a negative dielectric anisotropy. Alternatively, whether $\Delta\varepsilon$ is positive or negative may be determined in relation to the electrode structure. To provide a liquid crystal lens(es) having a short focal length, it is preferable to use a liquid crystal material having a large refractive index anisotropy ($\Delta n$).

The present embodiment assumes that the optical axis achieved when no voltage is being applied to the liquid crystal layer 11 (initial optical axis Ax1) corresponds to a line extending through the focal point of the liquid crystal lens es provided when no voltage is being applied to the liquid crystal layer 11, the line (normal line) being perpendicular to the surfaces of the lower substrate 6 and the upper substrate 16. The focal point is not necessarily a point. The description below uses (i) terms such as "on-axis movement" to refer to a movement of the focal point on the initial optical axis Ax1 and terms such as "off-axis movement" to refer to a movement of the focal point out of the initial optical axis Ax1. The description below also uses the term "transmitting light" to refer to linearly polarized light produced from backlight 2a through the polarizing sheet 4 and passing through the lower substrate 6 and the light concentrating section 10 toward the color display layer 20.

When no voltage is being applied to the liquid crystal layer 11, transmitting light travels on the initial optical axis Ax1 to be concentrated to the blocking region 25 as illustrated in (a) of FIG. 3. When a voltage is applied to the liquid crystal layer 11 between the lower electrodes 8 and the upper electrodes 18, transmitting light is concentrated to a different region due to an electric field, so that the focal point for light concentration moves out of the initial optical axis Ax1 as illustrated in (b) of FIG. 3. In other words, the orientation of liquid crystal molecules is changed so that the optical axis (voltage-induced optical axis Ax1) extends through a light-emitting region 21. The focal length of the liquid crystal lens(es) for concentration of transmitting light may be changed in response to the voltage application. This off-axis movement of the focal point is caused by the liquid crystal molecules 11a being oriented differently as illustrated in (b) of FIG. 3 due to an electric field between the upper electrode 18 and the lower electrode 8.

Specifically, when a voltage is being applied to the liquid crystal layer 11, liquid crystal molecules 11a in the red region (on the left side of FIG. 3) have respective directors arranged orthogonally to the electric field generated between a lower electrode 8 having a relatively small area and an upper electrode 18 having a relatively large area. Further, when a voltage is being applied to the liquid crystal layer 11, liquid crystal molecules 11a in the green region (on the right side of FIG. 3) have respective directors arranged orthogonally to the electric field generated between an upper electrode 18 having a relatively small area and a lower electrode 8 having a relatively large area. This causes the optical axis of the transmitting light in the light concentration region to be tilted to the side of that one of the lower electrodes 8 and the upper electrodes 18 which is smaller in area.

A designer may produce an optical design from the viewpoint below to provide a desired liquid crystal lens(es) having an optical axis for light concentration which optical axis changes from the initial optical axis Ax1 to the voltage-induced optical axis Ax2 in response to voltage application. When no voltage is being applied to the liquid crystal layer 11, how a liquid crystal lens(es) concentrates light may be controlled by controlling, for example, (i) the orientation of liquid crystal molecules, (ii) Δn of the liquid crystal, (iii) the width and/or diameter of the lens, (iv) the height of the lens, and/or (v) the refractive index difference at the interface of the liquid crystal lens. When a voltage is being applied to the liquid crystal layer 11, how a liquid crystal lens(es) concentrates light may be controlled by, for example, (i) controlling the arrangement, shapes, and/or widths of the electrodes, controlling a voltage applied, and/or (iii) inserting a dielectric. The liquid crystal display module is designed to, when a predetermined voltage is applied to the liquid crystal layer 11, change from (i) the state (blocking state) in which the optical axis for light concentration is the initial optical axis Ax1 to (ii) the state (displaying state) in which the optical axis for light concentration is the voltage-induced optical axis Ax1. The predetermined voltage may be selected on the basis of various conditions such as the above, and is not limited to any particular value. In the present specification, the voltage applied to change the state of the liquid crystal display module (liquid crystal display device) from the blocking state to the displaying state refers to the above predetermined voltage. This applies similarly to the description below of the present specification as well.

Advantages of the Liquid Crystal Display Device of the Present Embodiment

As described above, the liquid crystal display module 1A in accordance with the present embodiment is configured such that when no voltage is being applied to the liquid crystal layer 11, the liquid crystal layer 11 functions as a liquid crystal lens(es), and no light-emitting region 21 is present on the initial optical axis Ax1. In other words, when no voltage is being applied to the liquid crystal layer 11, transmitting light passing through the liquid crystal layer 11 is not concentrated to a light-emitting region 21. When a voltage is applied to the liquid crystal layer 11, the light concentration region moves off-axis so that transmitting light is concentrated to a light-emitting region 21.

With the above configuration, the open area ratio of each light-emitting region 21 only needs to be so large that the light-emitting region 21 can receive light concentrated thereto when a voltage is being applied to the liquid crystal layer 11. The open area ratio may thus be relatively low. The above configuration thereby makes it possible to (i) reduce leakage of light when no voltage is being applied and (ii) cause incident light to enter the light-emitting region 21 efficiently when a voltage is being applied. The above configuration also eliminates the need for an in-cell polarizing plate and increases the contrast. In a case where when no voltage is being applied, incident light is concentrated to the blocking region 25 so that, for instance, 100% of the incident light is blocked, the liquid crystal display module 1A has a transmittance of 0% in the state where the display pixels are in the OFF state.

Specifically, the liquid crystal display module 1A in accordance with the present embodiment is configured to move the focal point off-axis. Thus, lowering the open area ratio (that is, reducing the area of each light-emitting region 21) does not lower the transmittance (that is, there is no trade-off between the open area ratio and the transmittance) because the main factor for the transmittance is the ratio between (i) the area of light concentrated to the light-emitting region 21 and the area of the light-emitting region 21. The above configuration, in other words, makes it possible to achieve both a high contrast and a high transmittance.

The liquid crystal display module 1A in accordance with the present embodiment is configured to move the focal point off-axis. Thus, increasing the distance over which the focal point is moved (that is, increasing the distance between (i) the focal point on the initial optical axis Ax1 when no voltage is being applied and (ii) the light-emitting region 21) when the blocking state and the displaying state are switched can prevent unnecessary light from easily entering the light-emitting region 21. The above configuration, in other words, makes it easy to achieve both a high contrast and a high transmittance.

In a case where the light-emitting region 21 contains a quantum-dot phosphor containing Cd, the above configuration reduces the amount of Cd used. Further, in a case where the light-emitting region 21 contains a quantum-dot phosphor, the above configuration makes it possible to easily and inexpensively produce a liquid crystal display device having a wide color reproduction range and a low viewing angle dependence of image display.

The above configuration therefore makes it possible to achieve both a high contrast and a high transmittance without increasing the open area ratio.

Figure 4:
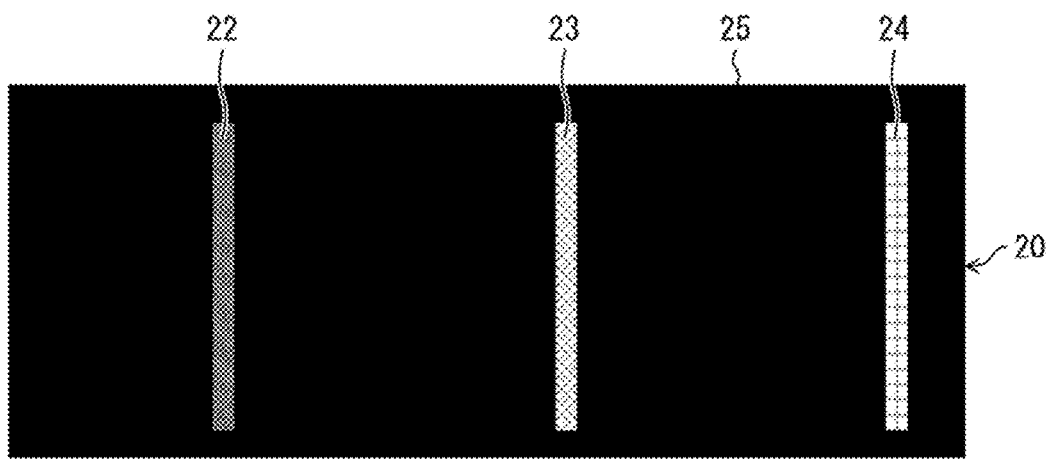
FIG. 4 is a plan view of a color display layer included in a variation of the liquid crystal display device.

Variations (a) FIG. 4 is a plan view of a color display layer included in a variation of the liquid crystal display module 1A. As illustrated in FIG. 4, the color display layer 20 included in a variation of the liquid crystal display module 1A has not only a red conversion region 22, a green conversion region 23, and a blocking region 25, but also a blue conversion region 24. In a case where the color display layer 20 has a red conversion region 22, a green conversion region 23, and a blue conversion region 24 as described above, the color display layer 20 is usable for sub-pixels having the three primary colors (RGB). The color display layer 20 may further have a yellow conversion region for sub-pixels having four colors.

(b) The liquid crystal display module 1A may include, for example, an overcoat layer and/or a spacer such as a photo spacer inside the liquid crystal cell.

The liquid crystal display module 1A may separately include, as necessary, a blocking layer in a region in FIG. 3 to which region light is concentrated when no voltage is being applied. In a case where a blocking layer is provided inside the upper substrate 16 in FIG. 3, the upper substrate 16 may have a three-layer structure (substrate/blocking layer/substrate).

(d) The liquid crystal display module 1A may include a dielectric layer between (i) the lower electrode 8 or the upper electrode 18 and (ii) the light concentrating section 10. The liquid crystal display module 1A may preferably include a dielectric layer between (i) the lower electrode 8 or the upper electrode 18 and (ii) one of the alignment films 13. With this configuration, the liquid crystal layer 11 provides a liquid crystal lens(es) having a smooth shape. Note that it is not necessarily preferable for a liquid crystal lens to have a smooth shape. Further, the region in which a dielectric layer is present has an increased driving voltage.

(e) The liquid crystal display module 1A may be configured such that (i) in a case where each light-emitting region 21 of the color display layer 20 contains a phosphor, the light-emitting region 21 has a plurality of regions inside that differ from each other in terms of the concentration of the phosphor or that a case where each light-emitting region 21 of the color display layer 20 is a layer that allows incident light to pass therethrough or that diffuses incident light, the light-emitting region 21 has a plurality of regions that differ from each other in terms of the light transmittance.

With the above configuration, adjusting the voltage to be applied so as to adjust (i) the focal point of transmitting light concentrated to the light-emitting region 21 and (ii) the position of the voltage-induced optical axis Ax2 can adjust the intensity of light emitted from the color display layer 20.

Figure 14:
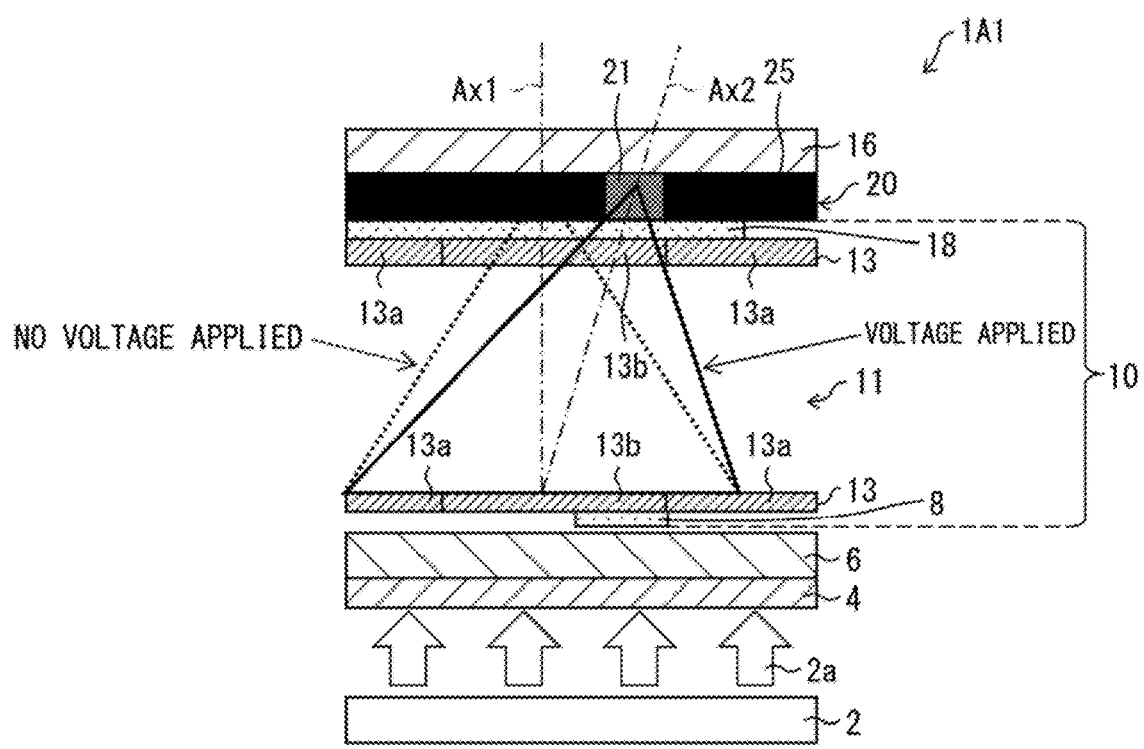
FIG. 14 is a cross-sectional view of (i) a liquid crystal display module in accordance with a variation of Embodiment 1 and (ii) a liquid crystal display device including the liquid crystal display module, the view schematically showing the respective configurations of the liquid crystal display module and the liquid crystal display device.

(f) FIG. 14 is a cross-sectional view of a liquid crystal display module 1A1 as a variation of the present embodiment, the view schematically showing the configuration of the liquid crystal display module 1A1. As illustrated in FIG. 14, the liquid crystal display module 1A1 is configured such that the color display layer 20 is between the upper substrate 16 and the liquid crystal layer 11. The liquid crystal display module 1A1 produces effects similar to those produced by the liquid crystal display module 1A.

The liquid crystal display module 1A1 may further include a light-transmitting dielectric layer between the color display layer 20 and the liquid crystal layer 11. This configuration facilitates concentrating transmitting light to a focal point in the light-emitting region 21.

(g) The alignment films 13 may each include a tilt alignment film. The alignment films 13 align the liquid crystal molecules of the liquid crystal layer 11 in a predetermined manner so that the liquid crystal layer 11 provides a liquid crystal lens(es). In other words, the alignment filters 13 each include (i) a first alignment layer for aligning liquid crystal molecules of the liquid crystal layer 11 in a first direction and (ii) a second alignment layer for aligning the liquid crystal molecules in a second direction different from the first direction.

Embodiment 2

The following description will discuss another embodiment of the present invention. For convenience of explanation, any member of the present embodiment that is identical in function to a member described for the embodiment above is assigned the same reference sign. Such a member is not described again here.

Figure 5:
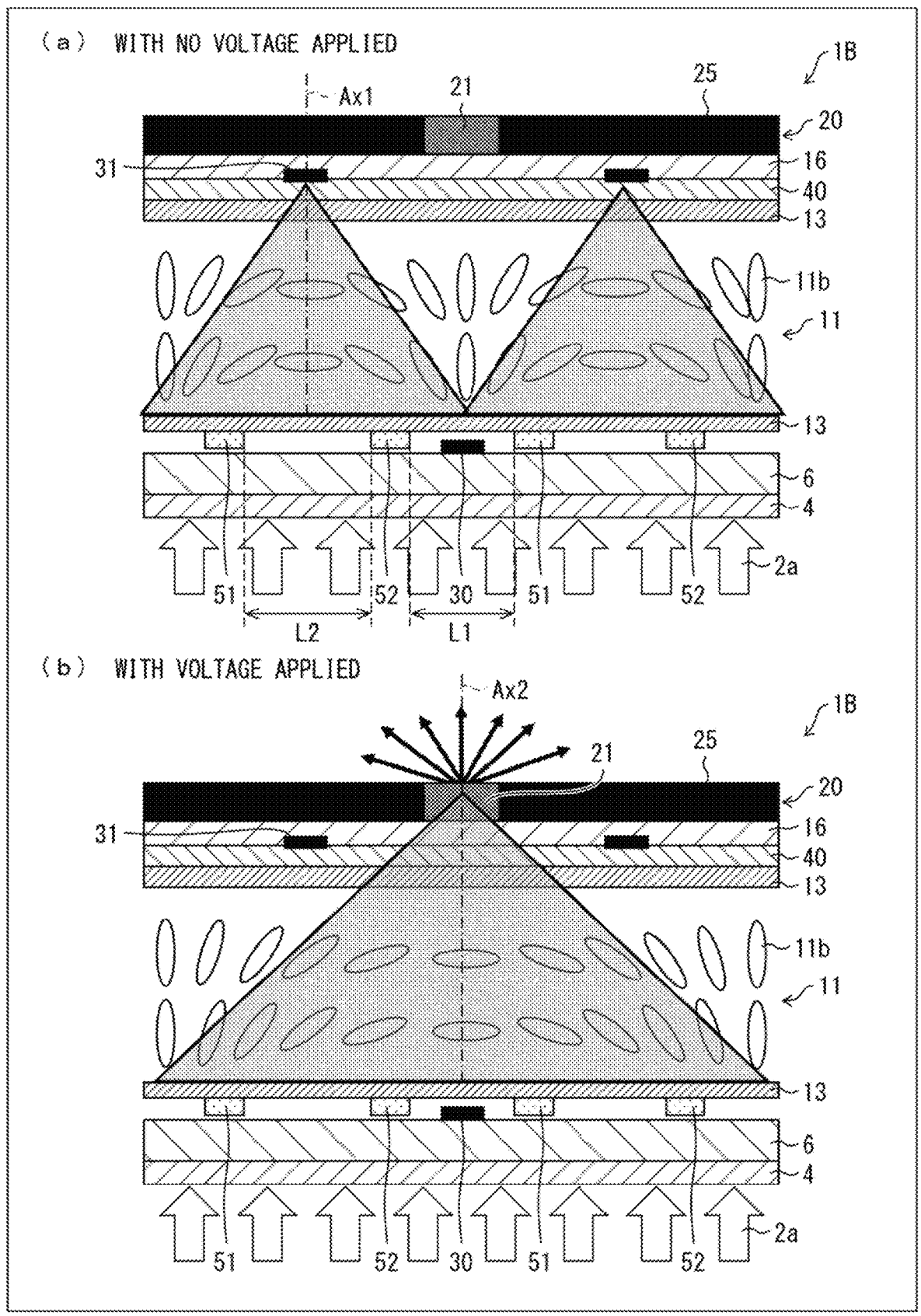
FIG. 5 provides schematic cross-sectional views of liquid crystal display module of Embodiment 2 of the present invention, where (a) illustrates the liquid crystal display module with no voltage being applied and (b) illustrates the liquid crystal display module with a voltage being applied.

FIG. 5 provides schematic cross-sectional views of a liquid crystal display module 1B of the present embodiment, where (a) illustrates the liquid crystal display module 1B with no voltage being applied and (b) illustrates the liquid crystal display module 1B with a voltage being applied. The liquid crystal display module 1B differs from the liquid crystal display module 1A in accordance with Embodiment 1 as follows: The liquid crystal display module 1B is configured to (i) form two liquid crystal lenses in the liquid crystal layer 11 when no voltage is applied to the liquid crystal layer 11 and (form a single liquid crystal lens in the liquid crystal layer 11 when a voltage is applied to the liquid crystal layer 11. The liquid crystal display module 1B has an electrode structure different from that of the liquid crystal display module 1A. The liquid crystal display module 1B has a single light-emitting region 21.

The liquid crystal display module 1B does not include an upper electrode 18. The liquid crystal display module 1B includes, in place of the lower electrode 8, first lower electrodes 51 and second lower electrodes 52 between the lower substrate 6 and an alignment film 13. The liquid crystal display module 1B includes (i) a dielectric layer 40 between an alignment film 13 and the upper substrate 16 and (ii) upper blocking sections 31 between the dielectric layer 40 and the upper substrate 16.

The liquid crystal display module 1B is configured such that the first lower electrodes 51 and the second lower electrodes 52 are arranged alternately and apart from each other in the left-right direction of FIG. 5. The liquid crystal display module 1B includes two first lower electrodes 51 and two second lower electrodes 52 in correspondence with a single light-emitting region 21. The respective numbers of first lower electrodes 51 and second lower electrodes 52 are, however, not limited to two.

With the above configuration, applying a voltage between each first lower electrode 51 and its corresponding second lower electrode 52 generates an arc-shaped electric field between the first lower electrode 51 and the second lower electrode 52 and macroscopically generates an electric field parallel to the lower substrate 6.

The liquid crystal display module 1B is configured such that the liquid crystal layer 11 contains liquid crystal molecules 11b, which are rod-shaped liquid crystal molecules of a nematic liquid crystal having a positive dielectric anisotropy ($\Delta\varepsilon$). Thus, when a voltage is being applied, the liquid crystal molecules 11b are oriented along the electric field, so that the liquid crystal layer 11 forms a liquid crystal lens as illustrated in (b) of FIG. 5.

The liquid crystal display module 1B of the present embodiment is configured such that the focal length of the liquid crystal lens may be greatly increased in response to voltage application. This is because normally, the focal length is proportional to the square of the diameter of the lens. In view of that, the liquid crystal display module 1B preferably includes upper blocking sections 31. The upper blocking sections 31 are not an essential component.

The upper blocking sections 31 are disposed between the color display layer 20 and the light concentrating section 10. The liquid crystal display module 1B preferably includes a dielectric layer 40 to dispose the upper blocking sections 31 as above.

The electrodes are preferably arranged such that L1 is smaller than L2, where L1 represents the distance between (i) that first lower electrode 51 which is closer to the light-emitting region 21 than the other is and that second lower electrode 52 which is closer to the light-emitting region 21 than the other is, and L2 represents the distance between the first lower electrode 51 and the second lower electrode 52 both on the left side of FIG. 5. This configuration facilitates aligning liquid crystal molecules 11*b* directly below the light-emitting region 21 so that those liquid crystal molecules 11*b* each have a horizontal director.

Embodiment 3

The following description will discuss another embodiment of the present invention. For convenience of explanation, any member of the present embodiment that is identical in function to a member described for the embodiments above is assigned the same reference sign. Such a member is not described again here.

Figure 7:
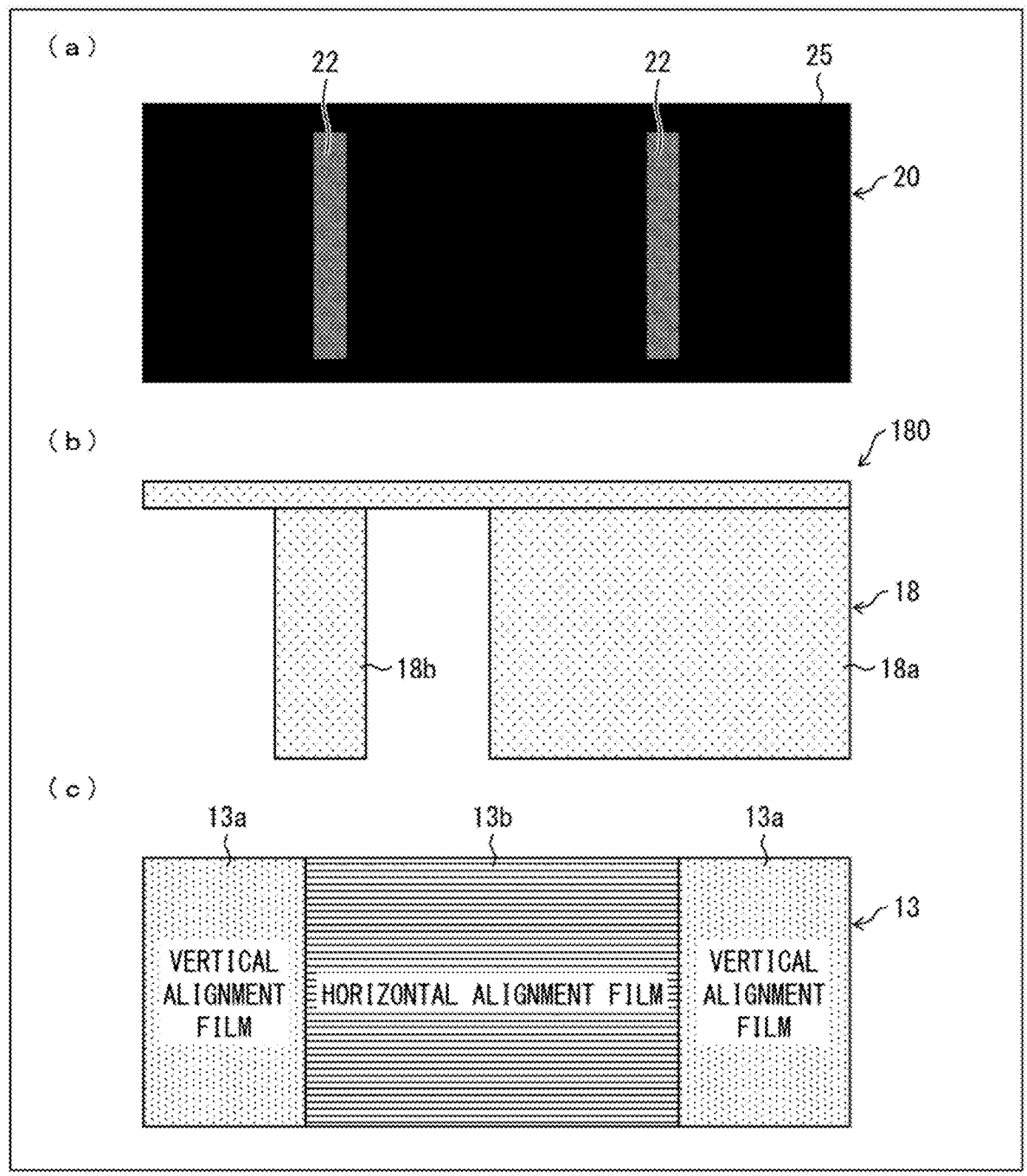
FIG. 7 provides schematic plan views of components of the liquid crystal display device, where (a) illustrates a color display layer, (b) illustrates an upper electrode, and (c) illustrates an alignment film.

FIG. 6 provides schematic cross-sectional views of a liquid crystal display module 1C of the present embodiment, where (a) illustrates the liquid crystal display module 1C with no voltage being applied and (b) illustrates the liquid crystal display module 1C with a voltage being applied. FIG. 7 provides schematic plan views of components of the liquid crystal display module 1C, where (a) illustrates the color display layer 20, (b) illustrates the upper electrode 18, and illustrates an alignment film 13.

The liquid crystal display module 1C differs from the liquid crystal display module 1A in accordance with Embodiment 1 as follows: The liquid crystal display module 1C is configured to (i) form a single liquid crystal lens in the liquid crystal layer 11 when no voltage is applied to the liquid crystal layer 11 and (ii) form two liquid crystal lenses in the liquid crystal layer 11 when a voltage is applied to the liquid crystal layer 11.

The liquid crystal display module 1C includes a color display layer 20 having two red conversion regions 22 each as a light-emitting region 21. When no voltage is being applied to the liquid crystal layer 11, the initial optical axis Ax1 extends through a blocking ion 25 between the two red conversion regions 22. In a case where the liquid crystal lens(es) has a substantially semicircular shape, the color display layer 20, the upper electrode 18, and each alignment film 13 may have respective shapes in a plan view as shown in illustrated in FIG. 7.

As illustrated in (b) of FIG. 7, the two upper electrodes 18 are each an extension of a base of an upper electrode line 180 as a common electrode which extension is in the shape of a comb tooth. One of the two upper electrodes 18 is a relatively large first extension (first upper electrode) 18*a*, whereas the other of the two upper electrodes 18 is a second extension (second upper electrode) 18*b* smaller than the first extension 18*a*.

The liquid crystal display module 1C includes alignment films 13 each as illustrated in (c) of FIG. 7. With this configuration, the liquid crystal layer 11 forms a single liquid crystal lens having a shape as illustrated in (a) of FIG. 6 when no voltage is applied to the liquid crystal layer 11. In other words, the liquid crystal layer 11, in the blocking state, forms a single liquid crystal lens that has an initial optical axis Ax1 extending through a central portion of the blocking region 25 and that corresponds to both the two red conversion regions 22. Applying a voltage to the liquid crystal layer 11 generates an electric field between the lower electrode 8 and the upper electrode 18, thereby orienting the liquid crystal molecules 11*a* of the liquid crystal layer 11 differently. This results in two liquid crystal lenses as illustrated in (b) of FIG. 6 being formed each having a voltage-induced optical axis Ax1.

The liquid crystal display module 1C of the present embodiment is configured such that the focal length of the liquid crystal lens may be decreased in response to voltage application. While a normal lens has a focal length that is proportional to the square of the diameter of the lens, a liquid crystal lens has a focal length that depends also on how smoothly liquid crystal molecules are oriented.

In a case where the focal length of the liquid crystal lens has become excessively short in response to voltage application, it may be difficult to dispose red conversion regions 22. Thus, it is preferable to adjust the focal length of the liquid crystal lens by, for example, adjusting the voltage to be applied, adjusting the electrode arrangement, and/or including a dielectric between an electrode and an alignment film 13.

Embodiment 4

The following description will discuss another embodiment of the present invention. For convenience of explanation, any member of the present embodiment that is identical in function to a member described for the embodiments above is assigned the same reference sign. Such a member is not described again here.

FIG. 8 provides schematic cross-sectional views of a liquid crystal display module 1D of the present embodiment, where (a) illustrates the liquid crystal display module 1D with no voltage being applied and (b) illustrates the liquid crystal display module 1D with a voltage being applied.

The liquid crystal display module 1D differs from the liquid crystal display module 1A in accordance with Embodiment 1 in that the liquid crystal display module 1D includes a light-blocking layer 32 between the upper electrode 18 and the upper substrate 16.

Light as converted through a light-emitting region 21 spreads in all directions. Light may thus return to a liquid crystal cell and then enter another, unintended light-emitting region 21 to, for example, decrease the contrast and/or degrade the color quality.

The liquid crystal display module 1D includes a light-blocking layer 32 in view of the above issue. The light-blocking layer 32 is disposed so as not to block black display, white display, and halftone display by the liquid crystal display module 1D. A light-blocking layer 32 having a larger area reduces more light entering an unintended light-emitting region 21, increases the contrast, and allows desired color tone to be expressed. A light-blocking layer 32 having an excessively large area, on the other hand, decreases the efficiency of light use.

Embodiment 5

The following description will discuss another embodiment of the present invention. For convenience of explanation, any member of the present embodiment that is identical in function to a member described for the embodiments above is assigned the same reference sign. Such a member is not described again here.

Figure 9:
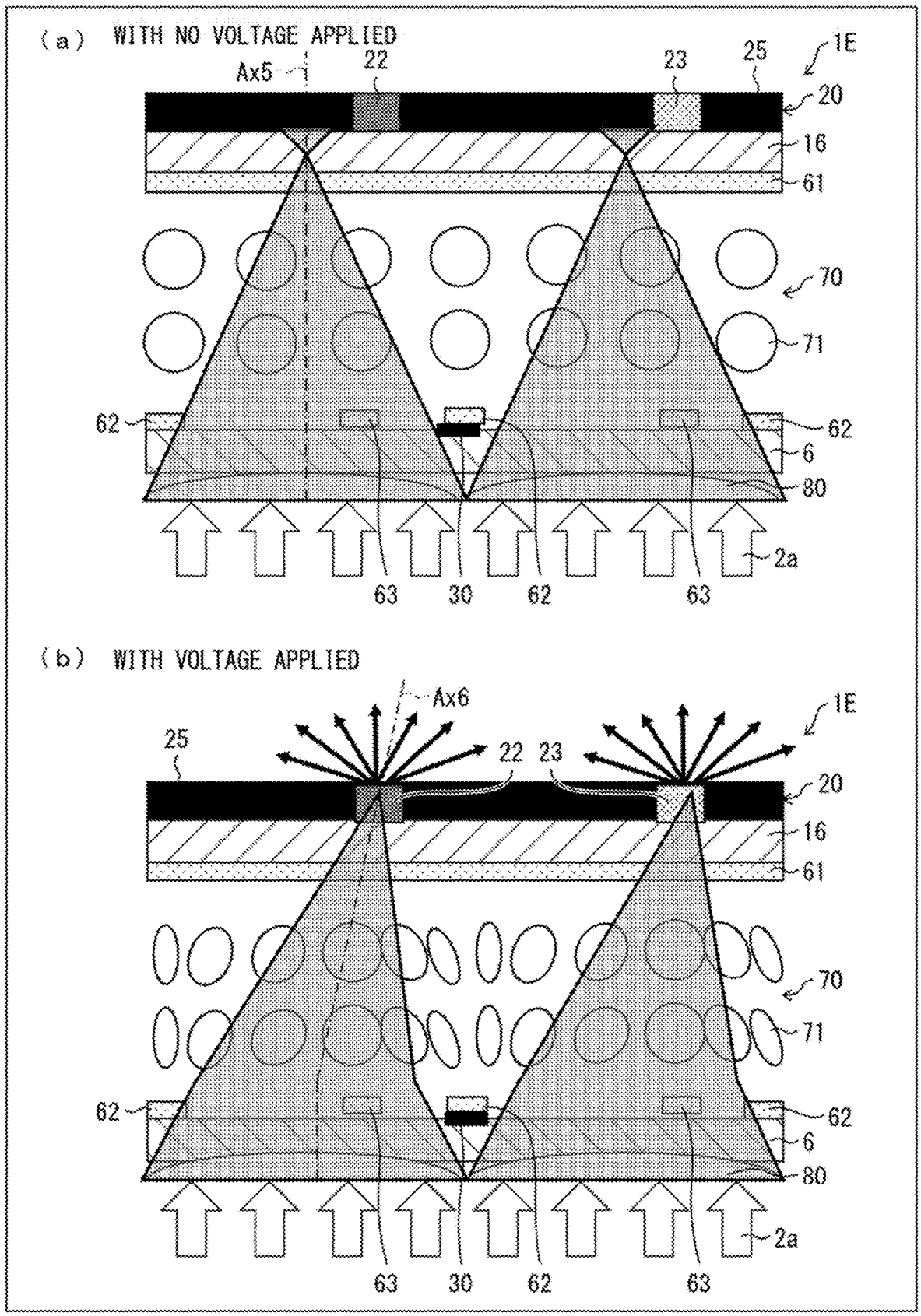
FIG. 9 provides schematic cross-sectional views of a liquid crystal display module of Embodiment 5 of the present invention, where (a) illustrates the liquid crystal display module with no voltage being applied and (b) illustrates the liquid crystal display module with a voltage being applied.

FIG. 9 provides schematic cross-sectional views of a liquid crystal display module 1E of the present embodiment, where (a) illustrates the liquid crystal display module 1E with no voltage being applied and (b) illustrates the liquid crystal display module 1E with a voltage being applied.

The liquid crystal display module 1E differs from the liquid crystal display module 1A in accordance with Embodiment 1 in that the liquid crystal display module 1E includes, in place of the liquid crystal layer 11, a liquid crystal layer 70 containing an optically isotropic liquid crystal 71. The liquid crystal layer 70 contains as a constituent component a nematic liquid crystal having positive dielectric anisotropy. The liquid crystal display module 1E does not include a polarizing sheet 4 or alignment films 13, but includes an optical lens layer 80 immediately below the lower substrate 6. The liquid crystal display module 1E is configured such that the liquid crystal layer 70 is optically isotropic when no voltage is being applied to the liquid crystal layer 70. The liquid crystal display module 1E thus uses an optical lens layer 80 to concentrate light.

The liquid crystal display module 1E does not include an upper electrode 18, but instead includes an upper electrode 61. The liquid crystal display module 1E includes, in place of the lower electrode 8, first lower electrodes 62 and second lower electrodes 63 between the lower substrate 6 and the liquid crystal layer 70.

Liquid Crystal Layer

Examples of the optically isotropic liquid crystal 71 contained in the liquid crystal layer 70 include a blue phase, a polymer-stabilized blue phase, a nanostructured chiral liquid crystal composite phase, and a liquid crystal isotropic phase.

The blue phase is a type of optically isotropic liquid crystal phase, and may normally be achieved by (i) mixing rod-shaped molecules of a nematic liquid crystal with a chiral agent and (ii) causing the pitch of alignment of liquid crystal molecules to be not larger than a length equivalent to the wavelength of visible light. The polymer-stabilized blue phase is a blue phase containing a polymer. While a blue phase is typically achieved within a narrow temperature range, the polymer-stabilized blue phase is achieved within a wide temperature range.

The nanostructured chiral liquid crystal composite phase is prepared through isotropic polymerization of a mixture of rod-shaped molecules of a nematic liquid crystal and a chiral agent on the basis of synergy between chirality and a polymer network.

The liquid crystal layer 70 is optically isotropic and does not function as a liquid crystal lens(es) when no voltage is being applied thereto. When a voltage is being applied thereto, the liquid crystal layer 70 functions as a liquid crystal lens(es), and the electric field causes the focal point for the light concentration region to move off-axis.

The liquid crystal layer 70 provides a liquid crystal lenses) having a shape that is not necessarily a hemisphere and that may alternatively be substantially semicircular. The optically isotropic liquid crystal 71, which is prepared by mixing rod-shaped molecules of a nematic liquid crystal with a chiral agent, has a positive dielectric anisotropy for the present embodiment. Alternatively, whether $\Delta\varepsilon$ is positive or negative may be determined in relation to the electrode structure. To provide a liquid crystal lens(es) having a short focal length, it is preferable to use a liquid crystal material having a large refractive index anisotropy ($\Delta n$). The liquid crystal layer 70 preferably contains a liquid crystal having a large dielectric anisotropy in order to be driven with use of a low voltage.

Since the liquid crystal layer 70 contains an optically isotropic liquid crystal, the liquid crystal display module 1E does not need an alignment process involving use of a polarizing sheet and alignment films. Using liquid crystal molecules having a positive dielectric anisotropy may not allow a liquid crystal display module to be completely independent of polarized light. The liquid crystal display module 1E may thus include a polarizing sheet between the liquid crystal layer 70 and the backlight unit or between the liquid crystal layer 70 and the color display layer 20. The liquid crystal display module 1E may include a liquid crystal layer containing liquid crystal molecules having a negative dielectric anisotropy.

Optical Lens Layer

The optical lens layer 80 preferably contains optical lenses each having a lens function that is not dependent on polarized light. The optical lens layer 80, which is disposed immediately below the lower substrate 6 in FIG. 9, may be disposed between the liquid crystal layer 70 and the color display layer 20. The optical lens layer 80 may alternatively be disposed inside the liquid crystal layer 70 as long as a desired object is attainable.

Electrodes

The liquid crystal display module 1E includes (i) an upper electrode 61 between the liquid crystal layer 70 and the upper substrate 16 and (ii) first lower electrodes 62 and second lower electrodes 63 between the liquid crystal layer 70 and the lower substrate 6 which first lower electrodes 62 and second lower electrodes 63 are arranged alternately in the left-right direction of FIG. 9. The liquid crystal display module 1E applies a voltage such that the upper electrode 61 and the second lower electrodes 63 have a substantially equal electric potential and that there is a predetermined electric potential difference between the upper electrode 61 and the first lower electrodes 62.

How Liquid Crystal Display Device Operates

When no voltage is being applied, backlight 2a emitted by a backlight unit (not shown) is concentrated by the optical lens layer 80 and passes through the liquid crystal layer 70 to be concentrated to the blocking region 25 as illustrated in (a) of FIG. 9. The description below refers to the optical axis in that state as the initial optical axis Ax5.

Applying a voltage changes how liquid crystal molecules of the optically isotropic liquid crystal 71 contained in the liquid crystal layer 70 are oriented as illustrated in (b) of FIG. 9, so that a liquid crystal lens(es) is formed. The liquid crystal molecules are oriented differently so that light passing through the liquid crystal layer 70 is concentrated to a red conversion region 22 or a green conversion region 23. The voltage application may change the focal length as well.

The backlight 2a is concentrated by the optical lens layer 80 and is then concentrated by the liquid crystal layer 70 to a red conversion region 22 or a green conversion region 23. The description below refers to the optical axis in that state as the voltage-induced optical axis Ax6. The voltage-induced optical axis Ax6 results from coupling of (i) the optical axis formed by the optical lens layer 80 (that is, a vertical optical axis) and (ii) the optical axis of a liquid crystal lens provided by the liquid crystal layer 70.

Advantages

Typically, an optically isotropic liquid crystal and a liquid crystal isotropic phase each have a quick electrooptic response. The liquid crystal display module 1E thus has a response time of around several microseconds to several milliseconds. The liquid crystal display module 1E does not need a polarizing sheet and has a reduced light loss. In addition, the liquid crystal display module 1E produces effects similar to those produced by the liquid crystal display module 1A in accordance with Embodiment 1.

Embodiment 6

The following description will discuss another embodiment of the present invention. For convenience of explanation, any member of the present embodiment that is identical in function to a member described for the embodiments above is assigned the same reference sign. Such a member is not described again here.

Figure 10:
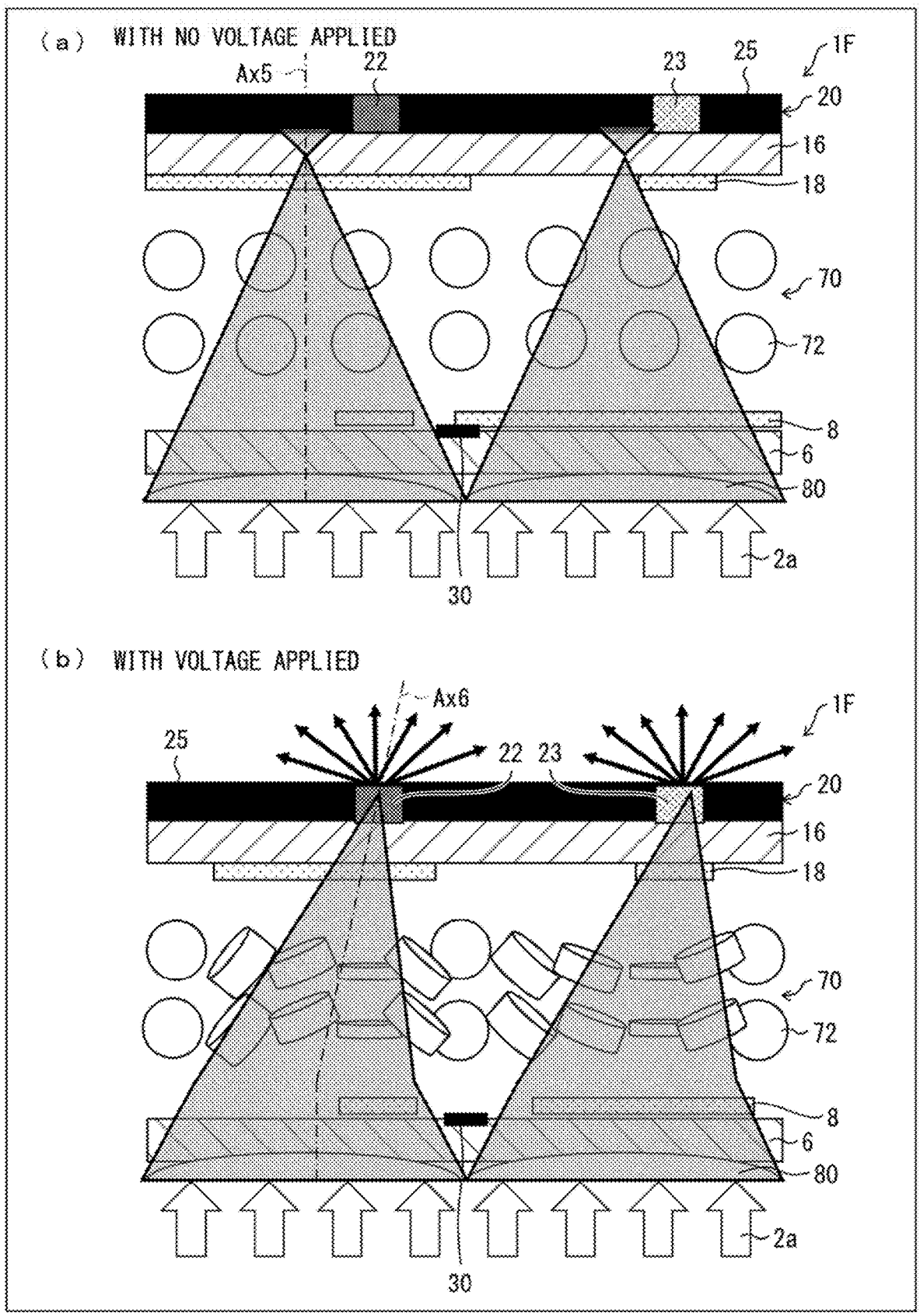
FIG. 10 provides schematic cross-sectional views of a liquid crystal display module of Embodiment 6 of the present invention, where (a) illustrates the liquid crystal display module with no voltage being applied and (b) illustrates the liquid crystal display module with a voltage being applied.

FIG. 10 provides schematic cross-sectional views of a liquid crystal display module 1F of the present embodiment, where (a) illustrates the liquid crystal display module 1F with no voltage being applied and (b) illustrates the liquid crystal display module 1F with a voltage being applied.

The liquid crystal display module 1F differs from the liquid crystal display module 1E in accordance with Embodiment 5 in that (i) the liquid crystal display module 1F includes, as the liquid crystal layer 70, an optically isotropic liquid crystal 72 containing a nematic liquid crystal having a negative dielectric anisotropy and that (ii) the liquid crystal display module 1F has an electrode structure similar to that of the liquid crystal display module 1A in accordance with Embodiment 1.

The liquid crystal display module 1F is similar to the liquid crystal display module 1E in accordance with Embodiment 5 in that the liquid crystal display module 1F forms no liquid crystal lens in the liquid crystal layer 70 when no voltage is applied thereto. The liquid crystal display module 1F is configured such that applying a voltage between the lower electrode 8 and the upper electrode 18 causes liquid crystal molecules of the optically isotropic liquid crystal 72 contained in the liquid crystal layer 70 to be oriented differently, so that a liquid crystal lenses) is formed.

Thus, when a voltage is being applied, the backlight 2a is concentrated by the optical lens layer 80 and is then concentrated by the liquid crystal layer 70 to a red conversion region 22 or a green conversion region 23. Using a liquid crystal layer 70 containing an optically isotropic liquid crystal 72 as described above makes it possible to concentrate light through the liquid crystal layer 70 independently of polarized light and regardless of whether a voltage is being applied.

In addition, the liquid crystal display module 1F produces effects similar to those produced by the liquid crystal display module 1E in accordance with Embodiment 6.

Embodiment 7

The following description will discuss another embodiment of the present invention. For convenience of explanation, any member of the present embodiment that is identical in function to a member described for the embodiments above is assigned the same reference sign. Such a member is not described again here.

Figure 11:
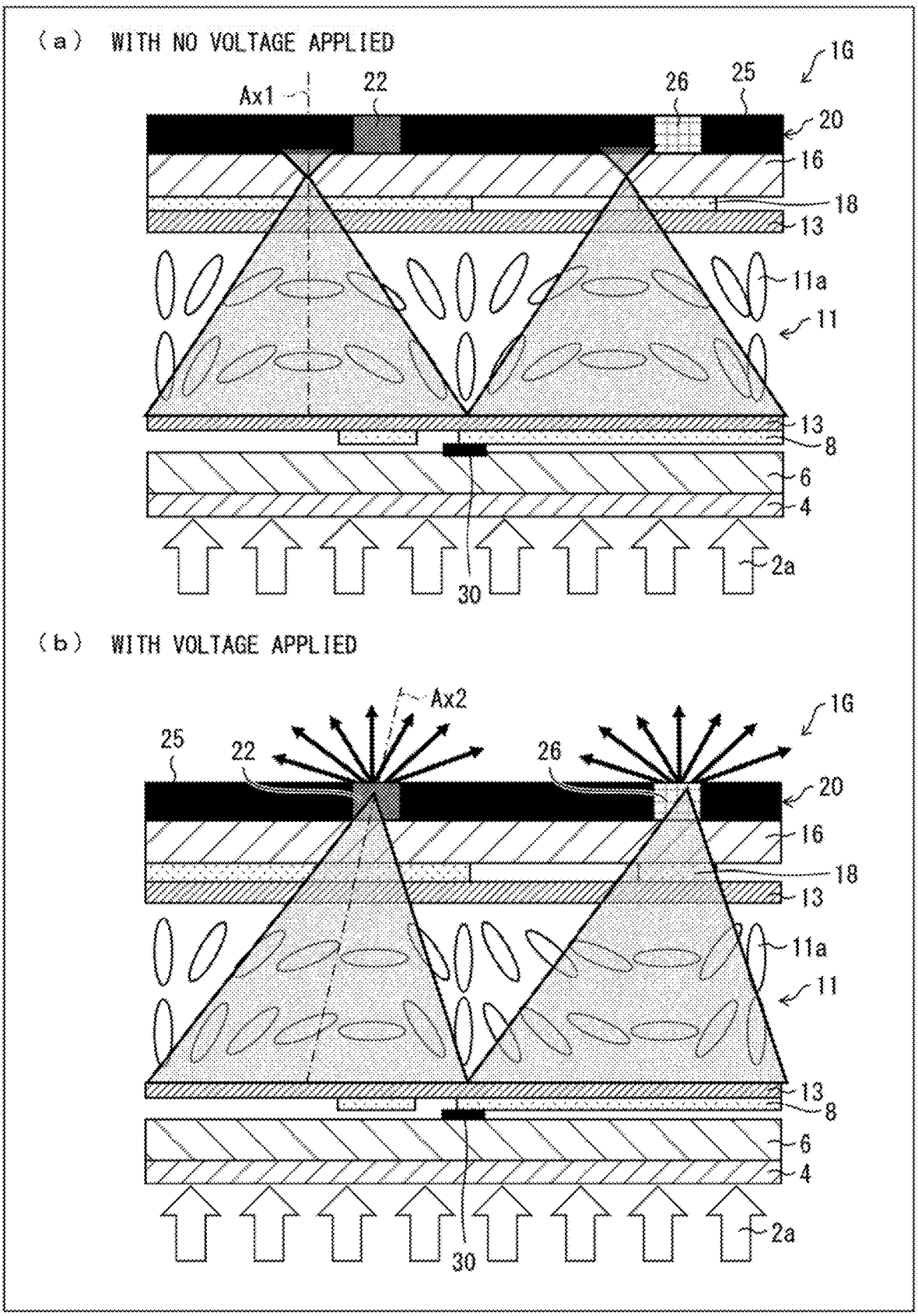
FIG. 11 provides schematic cross-sectional views of a liquid crystal display module of Embodiment 7 of the present invention, where (a) illustrates the liquid crystal display module with no voltage being applied and (b) illustrates the liquid crystal display module with a voltage being applied.

FIG. 11 provides schematic cross-sectional views of a liquid crystal display module 1G of the present embodiment, where (a) illustrates the liquid crystal display module 1G with no voltage being applied and (b) illustrates the liquid crystal display module 1G with a voltage being applied.

The liquid crystal display module 1G differs from the liquid crystal display module 1A in accordance with Embodiment 1 in that the liquid crystal display module 1G includes, in place of the green conversion region 23, a blue diffusion section 26 for diffusing blue light. The blue diffusion section 26 is a type of light-emitting region 21.

In a case where the liquid crystal display module 10 displays an image with use of sub-pixels having the three primary colors (RGB), the blue diffusion section 26 corresponds to a blue sub-pixel. The backlight 2a may be blue light having a wavelength equal to that of blue light for blue that the liquid crystal display module 1G is configured to display.

The blue diffusion section 26 may be colored blue. This prevents the blue diffusion section 26 from easily reflecting light having a color other than blue. The above configuration also prevents light having an undesirable wavelength from being reflected easily. This improves the contrast and color quality.

In a case where each light-emitting region contains as its phosphor a quantum-dot phosphor containing Cd, the above configuration makes it possible to use only a further reduced amount of Cd for the liquid crystal display module 1G, since the blue diffusion section 26 contains no quantum-dot phosphor.

[Recap]

A liquid crystal display module (1A to 1G) in accordance with a first aspect of the present invention includes: a first substrate (lower substrate 6); a second substrate (upper substrate 16) above the first substrate; a liquid crystal layer (liquid crystal layer 11, liquid crystal layer 70) between the first substrate and the second substrate; a color display section (color display layer 20) above the second substrate or between the second substrate and the liquid crystal layer; and two or more electrodes (lower electrode 8, upper electrode 18, first lower electrode 51, second lower electrode 52, upper electrode 61, first lower electrode 62, second lower electrode 63) for applying a voltage to the liquid crystal layer, the color display section including a blocking region 25 and at least one light-emitting region 21, the blocking region 25 being a region that blocks transmitting light entering the liquid crystal display module from below the first substrate and passing through the liquid crystal layer toward the color display section, the at least one light-emitting region 21 being a region that converts a wavelength of the transmitting light or that lets the transmitting light pass through the at least one light-emitting region 21 without wavelength conversion, the liquid crystal layer being switchable between a blocking state and a displaying state on a basis of a change, caused by applying the voltage to the liquid crystal layer, in an orientation of liquid crystal molecules contained in the liquid crystal layer, the blocking state being a state in which the transmitting light is concentrated to the blocking region on a first optical axis (initial optical axis Ax1, Ax5), the displaying state being a state in which the transmitting light is concentrated to the at least one light-emitting region on a second optical axis (voltage-induced optical axis Ax1, Ax6) different from the first optical axis.

With the above configuration, the open area ratio of each light-emitting region only needs to be so large that the light-emitting region can receive light concentrated thereto in the displaying state. The open area ratio may thus be relatively low. The above configuration thereby makes it possible to (i) reduce leakage of light in the blocking state and (ii) cause transmitting light to enter the light-emitting region efficiently in the displaying state. The above configuration also eliminates the need for an in-cell polarizing plate and increases the contrast.

The liquid crystal display module is configured to move the focal point off-axis. Thus, lowering the open area ratio (that is, reducing the area of each light-emitting region) does not lower the transmittance (that is, there is no trade-off between the open area ratio and the transmittance) because the main factor for the transmittance is the ratio between (i) the area of light concentrated to the light-emitting region and (ii) the area of the light-emitting region. The above configuration, in other words, makes it possible to achieve both a high contrast and a high transmittance.

The liquid crystal display module is configured to move the focal point off-axis. Thus, increasing the distance over which the focal point is moved (that is, increasing the distance between (i) the focal point on the first optical axis when no voltage is being applied and (ii) the light-emitting region) when the blocking state and the displaying state are switched can prevent unnecessary light from easily entering the light-emitting region 21. The above configuration, in other words, makes it easy to (i) achieve both a high contrast and a high transmittance and (ii) further increase the efficiency of light use.

The above configuration therefore makes it possible to achieve both a high contrast and a high transmittance without increasing the open area ratio.

In a case where the light-emitting region contains a quantum-dot phosphor containing Cd, the above configuration reduces the amount of Cd used. Further, in a case where the light-emitting region contains a quantum-dot phosphor, the above configuration makes it possible to easily and inexpensively produce a liquid crystal display device having a wide color reproduction range and a low viewing angle dependence of image display.

A liquid crystal display module in accordance with a second aspect of the present invention is configured as in the first aspect and may further include: a polarizing layer (polarizing sheet 4) provided below the liquid crystal layer so as to let only a linearly polarized component of light incident on the polarizing layer pass through the polarizing layer; and an upper alignment layer (alignment film 13) provided immediately above the liquid crystal layer and a lower alignment layer (alignment film 13) provided immediately below the liquid crystal layer, the upper and lower alignment layers aligning the liquid crystal molecules in an initial state, wherein the upper and lower alignment layers each include (i) at least one first alignment layer (vertical alignment film 13a) aligning the liquid crystal molecules (liquid crystal molecules 11a, liquid crystal molecules 11b) in a first direction and (ii) at least one second alignment layer (horizontal alignment film 13b) aligning the liquid crystal molecules in a second direction different from the first direction, the liquid crystal layer provides at least one liquid crystal lens configured to, on a basis of the liquid crystal molecules aligned in a predetermined state with use of the at least one first alignment layer and the at least one second alignment layer of each of the upper and lower alignment layers, concentrate the transmitting light having passed through the polarizing layer and passing through the liquid crystal layer, and the liquid crystal layer is in (i) the blocking state in a case where the voltage is not being applied to the liquid crystal layer and is in (ii) the displaying state in a case where the voltage is being applied to the liquid crystal layer in a predetermined magnitude.

The above configuration allows the alignment layers to align the liquid crystal molecules in the initial state. The liquid crystal layer thus provides a liquid crystal lens(es) when no voltage is being applied to the liquid crystal layer. The liquid crystal lens(es), when no voltage is being applied, concentrates transmitting light to the blocking region. Applying a voltage to the liquid crystal layer changes how the liquid crystal molecules are oriented and thus deforms the liquid crystal lens. This causes the focal point of transmitting light to move off-axis, thereby causing the transmitting light to be concentrated to a light-emitting region. The above configuration thus makes it possible to switch between the blocking state and the displaying state.

A liquid crystal display module in accordance with a third aspect of the present invention is configured as in the second aspect and may be further configured such that the liquid crystal molecules have a negative dielectric anisotropy, the two or more electrodes include, for each of the at least one light-emitting region, a pair of (i) an upper electrode 18 provided between the upper alignment layer and the second substrate and (ii) a lower electrode 8 provided between the lower alignment layer and the first substrate, a first one of the upper electrode and the lower electrode is positioned directly below the at least one light-emitting region and is smaller in area than a second one of the upper electrode and the lower electrode, and in a case where the voltage is applied to the liquid crystal layer, the upper electrode and the lower electrode induce the change in the orientation of the liquid crystal molecules such that an optical axis on which the transmitting light is concentrated changes from the first optical axis to the second optical axis.

With the above configuration, applying a voltage between the upper electrode and the lower electrode causes the liquid crystal lens to deform such that the apex of the liquid crystal lens becomes closer to a line perpendicular to the position at which that one of the upper electrode and the lower electrode which is smaller in area is present. This causes the optical axis of transmitting light to move and the focal point of the transmitting light to move off-axis, thereby making it possible to switch between the blocking state and the displaying state.

A liquid crystal display module in accordance with a fourth aspect of the present invention is configured as in the second or third aspect and may be further configured such that the at least one first alignment layer includes at least one vertical alignment film 13a, the at least one second alignment layer includes at least one horizontal alignment film 13b, the at least one vertical alignment film and the at least one horizontal alignment film are arranged alternately, and the liquid crystal molecules are aligned in the predetermined state with use of the at least one vertical alignment film and the at least one horizontal alignment film so that the transmitting light is concentrated to the blocking region on the first optical axis in the case where the voltage is not being applied to the liquid crystal layer.

With the above configuration, vertical alignment films and horizontal alignment films align the liquid crystal molecules of the liquid crystal layer in a predetermined state, thereby making it easy to form a liquid crystal lens in the liquid crystal layer. This allows the liquid crystal lens to concentrate transmitting light to the blocking region efficiently when no voltage is being applied.

A liquid crystal display module in accordance with a fifth aspect of the present invention is configured as in the first aspect and may further include: an optical lens (optical lens layer 80) provided at least below, above, or in the liquid crystal layer, wherein the liquid crystal layer is optically isotropic, and the transmitting light is concentrated to the blocking region with use of the optical lens in the blocking state.

With the above configuration, the optically isotropic liquid crystal layer has a quick electrooptic response. The liquid crystal display module thus has a response time of several microseconds to several milliseconds. The liquid crystal display module does not need a polarizing layer and has a reduced light loss. This allows the liquid crystal display module to have a short electrooptic response time and achieve both a high contrast and a high transmittance without increasing the open area ratio.

A liquid crystal display module in accordance with a sixth aspect of the present invention is configured as in the fifth aspect and may be further configured such that the liquid crystal layer contains liquid crystal molecules having a positive dielectric anisotropy, the two or more electrodes include (i) an upper electrode 61 provided between the liquid crystal layer and the second substrate and (ii) at least one first lower electrode 62 and at least one second lower electrode 63 both provided between the liquid crystal layer and the first substrate, the at least one first lower electrode and the at least one second lower electrode are arranged alternately and apart from each other, the at least one first lower electrode is positioned directly below the at least one light-emitting region, and in the displaying state, (i) the upper electrode and the at least one first lower electrode have a substantially equal electric potential, and (ii) a predetermined electric potential difference is present between the at least one first lower electrode and the at least one second lower electrode so that the orientation of the liquid crystal molecules is changed such that light having passed through the liquid crystal layer and the optical lens is concentrated to the at least one light-emitting region on the second optical axis.

With the above configuration, the optically isotropic liquid crystal layer contains liquid crystal molecules having a positive dielectric anisotropy. Applying a voltage to the liquid crystal layer from the upper electrode, the first lower electrode, and the second lower electrode allows the liquid crystal layer to form a liquid crystal lens. This allows transmitting light to be concentrated by (i) an optical lens to the blocking region when no voltage is being applied and by (ii) a liquid crystal lens to the light-emitting region when a voltage is being applied. Further, the liquid crystal display module is capable of concentrating transmitting light independently of polarized light and regardless of whether a voltage is being applied.

A liquid crystal display module in accordance with a seventh aspect of the present invention is configured as in the fifth aspect and may be further configured such that the liquid crystal layer contains liquid crystal molecules having a negative dielectric anisotropy, the two or more electrodes include, for each of the at least one light-emitting region, a pair of (i) an upper electrode 18 provided between the liquid crystal layer and the second substrate and (ii) a lower electrode 8 provided between the liquid crystal layer and the first substrate, a first one of the upper electrode and the lower electrode is positioned directly below the at least one light-emitting region and is smaller in area than a second one of the upper electrode and the lower electrode, and in the displaying state, the voltage is applied between the upper electrode and the lower electrode so that the orientation of the liquid crystal molecules is changed such that light having passed through the liquid crystal layer and the optical lens is concentrated to the at least one light-emitting region on the second optical axis.

With the above configuration, the optically isotropic liquid crystal layer contains liquid crystal molecules having a negative dielectric anisotropy. Applying a voltage to the upper electrode and the lower electrode allows the liquid crystal layer to form a liquid crystal lens. This allows transmitting light to be concentrated by (i) an optical lens to the blocking region when no voltage is being applied and by (ii) a liquid crystal lens to the light-emitting region when a voltage is being applied. Further, the liquid crystal display module is capable of concentrating transmitting light independently of polarized light and regardless of whether a voltage is being applied.

A liquid crystal display module in accordance with an eighth aspect of the present invention is configured as in any one of the first to sixth aspects and may be further configured such that the at least one light-emitting region includes two light-emitting regions, in the blocking state, the liquid crystal layer provides a single liquid crystal lens for the two light-emitting regions so that the first optical axis extends through a central portion of a part of the blocking region which part is between the two light-emitting regions, and in the displaying state, the liquid crystal layer provides two liquid crystal lenses corresponding respectively to the two light-emitting regions and each having the second optical axis.

The above configuration allows the focal point to move off-axis over a relatively large distance between (1) the first optical axis when no voltage is being applied and (ii) the second optical axis when a voltage is being applied. This makes it possible to increase the efficiency of blocking transmitting light when no voltage is being applied. The above configuration also allows the second optical axis to be perpendicular to the first substrate when a voltage is being applied. A liquid crystal lens having such a second optical axis may be formed in the liquid crystal layer. Thus, a liquid crystal lens to be formed in the liquid crystal layer may have a simple shape, thereby facilitating optical design.

A liquid crystal display module in accordance with a ninth aspect of the present invention is configured as in the second aspect and may be further configured such that the liquid crystal molecules have a positive dielectric anisotropy, the two or more electrodes include at least one first lower electrode 51 and at least one second lower electrode 52 both provided between the lower alignment layer and the first substrate the at least one first lower electrode and the at least one second lower electrode are arranged alternatively and apart from each other, for each of the at least one light-emitting region, (i) the at least one first lower electrode includes at least two first lower electrodes, and (ii) the at least one second lower electrode includes at least two second lower electrodes, each of the at least one light-emitting region is positioned directly above a space between, among the at least two first lower electrodes and the at least two second lower electrodes, a first lower electrode and a second lower electrode adjacent to each other, in a case where the voltage is applied between the at least two first lower electrode and the at least two second lower electrode adjacent to each other, the liquid crystal layer provides the at least one liquid crystal lens such that the transmitting light is concentrated to the at least one light-emitting region on the second optical axis.

The above configuration allows a larger liquid crystal lens to be provided when a voltage is being applied and thus allows a larger amount of transmitting light to be concentrated to the light-emitting region. This in turn allows light emitted from the light-emitting region to have a higher intensity and facilitates increasing the luminance of color display at the color display section.

A liquid crystal display module in accordance with a tenth aspect of the present invention is configured as in any one of the first to ninth aspects and may further include: a lower blocking section 30 provided below the liquid crystal layer and configured to at least partially block a portion of the transmitting light which portion is not concentrated on the first optical axis or the second optical axis.

The above configuration makes it possible to increase the efficiency of blocking transmitting light when no voltage is being applied.

A liquid crystal display module in accordance with an eleventh aspect of the present invention is configured as in any one of the first to tenth aspects and may further include: a blocking layer (upper blocking section 31, light-blocking layer 32) provided at such a position between the liquid crystal layer and the color display section as not to prevent the transmitting light from being concentrated to the at least one light-emitting region in the displaying state.

The above configuration makes it possible to (i) increase the efficiency of blocking transmitting light when no voltage is being applied and (ii) prevent light emitted from the light-emitting region from returning to the liquid crystal layer. This increases the contrast.

A liquid crystal display module in accordance with a twelfth aspect of the present invention is configured as in any one of the first to eleventh aspects and may be further configured such that the at least one light-emitting region contains a quantum-dot phosphor.

The above configuration, which involves a quantum-dot phosphor, allows light to be converted in the light-emitting region with a particularly high conversion efficiency, and makes it possible to generate monochromatic light having a high purity.

A liquid crystal display module in accordance with a thirteenth aspect of the present invention is configured as in any one of the first to twelfth aspects and may further include a light-transmitting dielectric layer, wherein the color display section is between the liquid crystal layer and the second substrate, and the light-transmitting dielectric layer is between the color display section and the liquid crystal layer.

The above configuration allows transmitting light to have a small focal length in a case where the color display section is relatively close to the liquid crystal layer.

A liquid crystal display device in accordance with a fourteenth aspect of the present invention includes: a liquid crystal display module in accordance with any one of the first to thirteenth aspects; and a light source section (backlight unit 2) configured to emit backlight (backlight 2a) traveling from below the first substrate toward the liquid crystal layer.

The above configuration provides a liquid crystal display device including a liquid crystal display module configured as described above.

A liquid crystal display device in accordance with a fifteenth aspect of the present invention is configured as in the fourteenth aspect and may be further configured such that the backlight is parallel light.

The above configuration allows a liquid crystal lens to concentrate light more efficiently.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST 1A to 1G Liquid crystal display module
2 Backlight unit (light source section)
2a Backlight
6 Lower substrate (first substrate)
8 Lower electrode (electrode)
18 Upper electrode (electrode)
11, 70 Liquid crystal layer
16 Upper substrate (second substrate)
20 Color display layer (color display section)
21 Light-emitting region
25 Blocking region
51 First lower electrode (electrode)
52 Second lower electrode (electrode)
61 Upper electrode (electrode)
62 First lower electrode (electrode)
63 Second lower electrode (electrode)
Ax1, Ax5 initial optical axis (first optical axis)
Ax1, Ax6 Voltage-induced optical axis (second optical axis)

The invention claimed is:

1. A liquid crystal display module, comprising:
a first substrate;
a second substrate above the first substrate;
a liquid crystal layer between the first substrate and the second substrate;
a polarizing layer provided below the liquid crystal layer so as to let only a linearly polarized component of light incident on the polarizing layer pass through the polarizing layer; and
an upper alignment layer provided immediately above the liquid crystal layer and a lower alignment layer provided immediately below the liquid crystal layer, the upper and lower alignment layers aligning liquid crystal molecules contained in the liquid crystal layer in an initial state;
a color display section above the second substrate or between the second substrate and the liquid crystal layer; and
two or more electrodes for applying a voltage to the liquid crystal layer,
the color display section including a blocking region and at least one light-emitting region,
the blocking region being a region that blocks transmitting light entering the liquid crystal display module from below the first substrate and passing through the liquid crystal layer toward the color display section,
the at least one light-emitting region being a region that converts a wavelength of the transmitting light or that lets the transmitting light pass through the at least one light-emitting region without wavelength conversion,
the liquid crystal layer being switchable between a blocking state and a displaying state on a basis of a change, caused by applying the voltage to the liquid crystal layer, in an orientation of the liquid crystal molecules contained in the liquid crystal layer,
the blocking state being a state in which the transmitting light is concentrated to the blocking region on a first optical axis,
the displaying state being a state in which the transmitting light is concentrated to the at least one light-emitting region on a second optical axis different from the first optical axis,
wherein the upper and lower alignment layers each include (i) at least one first alignment layer aligning the liquid crystal molecules in a first direction and (ii) at least one second alignment layer aligning the liquid crystal molecules in a second direction different from the first direction,
the liquid crystal layer provides at least one liquid crystal lens configured to, on a basis of the liquid crystal molecules aligned in a predetermined state with use of the at least one first alignment layer and the at least one second alignment layer of each of the upper and lower alignment layers, concentrate the transmitting light having passed through the polarizing layer and passing through the liquid crystal layer, and the liquid crystal layer is in (i) the blocking state in a case where the voltage is not being applied to the liquid crystal layer and is in (ii) the displaying state in a case where the voltage is being applied to the liquid crystal layer in a predetermined magnitude.

2. The liquid crystal display module according to claim 1, wherein the liquid crystal molecules have a negative dielectric anisotropy, the two or more electrodes include, for each of the at least one light-emitting region, a pair of (i) an upper electrode provided between the upper alignment layer and the second substrate and (ii) a lower electrode provided between the lower alignment layer and the first substrate, a first one of the upper electrode and the lower electrode is positioned directly below the at least one light-emitting region and is smaller in area than a second one of the upper electrode and the lower electrode, and in a case where the voltage is applied to the liquid crystal layer, the upper electrode and the lower electrode induce the change in the orientation of the liquid crystal molecules such that an optical axis on which the transmitting light is concentrated changes from the first optical axis to the second optical axis.

3. The liquid crystal display module according to claim 1, wherein the at least one first alignment layer includes at least one vertical alignment film, the at least one second alignment layer includes at least one horizontal alignment film, the at least one vertical alignment film and the at least one horizontal alignment film are arranged alternately, and the liquid crystal molecules are aligned in the predetermined state with use of the at least one vertical alignment film and the at least one horizontal alignment film so that the transmitting light is concentrated to the blocking region on the first optical axis in the case where the voltage is not being applied to the liquid crystal layer.

4. A liquid crystal display module, comprising:

a first substrate;

a second substrate above the first substrate;

a liquid crystal layer between the first substrate and the second substrate;

an optical lens provided at least below, above, or in the liquid crystal layer;

a color display section above the second substrate or between the second substrate and the liquid crystal layer; and two or more electrodes for applying a voltage to the liquid crystal layer, the color display section including a blocking region and at least one light-emitting region, the blocking region being a region that blocks transmitting light entering the liquid crystal display module from below the first substrate and passing through the liquid crystal layer toward the color display section, the at least one light-emitting region being a region that converts a wavelength of the transmitting light or that lets the transmitting light pass through the at least one light-emitting region without wavelength conversion, the liquid crystal layer being switchable between a blocking state and a displaying state on a basis of a change, caused by applying the voltage to the liquid crystal layer, in an orientation of liquid crystal molecules contained in the liquid crystal layer, the blocking state being a state in which the transmitting light is concentrated to the blocking region on a first optical axis, the displaying state being a state in which the transmitting light is concentrated to the at least one light-emitting region on a second optical axis different from the first optical axis, wherein the liquid crystal layer is optically isotropic, and the transmitting light is concentrated to the blocking region with use of the optical lens in the blocking state.

5. The liquid crystal display module according to claim 4, wherein the liquid crystal layer contains liquid crystal molecules having a positive dielectric anisotropy, the two or more electrodes include (i) an upper electrode provided between the liquid crystal layer and the second substrate and (ii) at least one first lower electrode and at least one second lower electrode both provided between the liquid crystal layer and the first substrate, the at least one first lower electrode and the at least one second lower electrode are arranged alternately and apart from each other, the at least one first lower electrode is positioned directly below the at least one light-emitting region, and in the displaying state, (i) the upper electrode and the at least one first lower electrode have a substantially equal electric potential, and (ii) a predetermined electric potential difference is present between the at least one first lower electrode and the at least one second lower electrode so that the orientation of the liquid crystal molecules is changed such that light having passed through the liquid crystal layer and the optical lens is concentrated to the at least one light-emitting region on the second optical axis.

6. The liquid crystal display module according to claim 4, wherein the liquid crystal layer contains liquid crystal molecules having a negative dielectric anisotropy, the two or more electrodes include, for each of the at least one light-emitting region, a pair of (i) an upper electrode provided between the liquid crystal layer and the second substrate and (ii) a lower electrode provided between the liquid crystal layer and the first substrate, a first one of the upper electrode and the lower electrode is positioned directly below the at least one light-emitting region and is smaller in area than a second one of the upper electrode and the lower electrode, and in the displaying state, the voltage is applied between the upper electrode and the lower electrode so that the orientation of the liquid crystal molecules is changed such that light having passed through the liquid crystal layer and the optical lens is concentrated to the at least one light-emitting region on the second optical axis.

7. The liquid crystal display module according to claim 1, wherein the at least one light-emitting region includes two light-emitting regions, in the blocking state, the liquid crystal layer provides a single liquid crystal lens for the two light-emitting regions so that the first optical axis extends through a central portion of a part of the blocking region which part is between the two light-emitting regions, and in the displaying state, the liquid crystal layer provides two liquid crystal lenses corresponding respectively to the two light-emitting regions and each having the second optical axis.

8. The liquid crystal display module according to claim 1, wherein
the liquid crystal molecules have a positive dielectric anisotropy,
the two or more electrodes include at least one first lower electrode and at least one second lower electrode both provided between the lower alignment layer and the first substrate,
the at least one first lower electrode and the at least one second lower electrode are arranged alternatively and apart from each other,
for each of the at least one light-emitting region, (i) the at least one first lower electrode includes at least two first lower electrodes, and (ii) the at least one second lower electrode includes at least two second lower electrodes,
each of the at least one light-emitting region is positioned directly above a space between, among the at least two first lower electrodes and the at least two second lower electrodes, a first lower electrode and a second lower electrode adjacent to each other,
in a case where the voltage is applied between the at least two first lower electrode and the at least two second lower electrode adjacent to each other, the liquid crystal layer provides the at least one liquid crystal lens such that the transmitting light is concentrated to the at least one light-emitting region on the second optical axis.

9. The liquid crystal display module according to claim 1, further comprising:
a lower blocking section provided below the liquid crystal layer and configured to at least partially block a portion of the transmitting light which portion is not concentrated on the first optical axis or the second optical axis.

10. The liquid crystal display module according to claim 1, further comprising:
a blocking layer provided at such a position between the liquid crystal layer and the color display section as not to prevent the transmitting light from being concentrated to the at least one light-emitting region in the displaying state.

11. The liquid crystal display module according to claim 1, wherein
the at least one light-emitting region contains a quantum-dot phosphor.

12. The liquid crystal display module according to claim 1, further comprising:
a light-transmitting dielectric layer, wherein
the color display section is between the second substrate and the liquid crystal layer, and
the light-transmitting dielectric layer is between the color display section and the liquid crystal layer.

13. A liquid crystal display device, comprising:
a liquid crystal display module according to claim 1; and
a light source section configured to emit backlight traveling from below the first substrate toward the liquid crystal layer.

14. The liquid crystal display device according to claim 13, wherein
the backlight is parallel light.

15. The liquid crystal display module according to claim 4, wherein
the at least one light-emitting region includes two light-emitting regions,
in the blocking state, the liquid crystal layer provides a single liquid crystal lens for the two light-emitting regions so that the first optical axis extends through a central portion of a part of the blocking region which part is between the two light-emitting regions, and
in the displaying state, the liquid crystal layer provides two liquid crystal lenses corresponding respectively to the two light-emitting regions and each having the second optical axis.

16. The liquid crystal display module according to claim 4, wherein
the liquid crystal molecules have a positive dielectric anisotropy,
the two or more electrodes include at least one first lower electrode and at least one second lower electrode both provided between the lower alignment layer and the first substrate,
the at least one first lower electrode and the at least one second lower electrode are arranged alternatively and apart from each other,
for each of the at least one light-emitting region, (i) the at least one first lower electrode includes at least two first lower electrodes, and (ii) the at least one second lower electrode includes at least two second lower electrodes,
each of the at least one light-emitting region is positioned directly above a space between, among the at least two first lower electrodes and the at least two second lower electrodes, a first lower electrode and a second lower electrode adjacent to each other,
in a case where the voltage is applied between the at least two first lower electrode and the at least two second lower electrode adjacent to each other, the liquid crystal layer provides the at least one liquid crystal lens such that the transmitting light is concentrated to the at least one light-emitting region on the second optical axis.

17. The liquid crystal display module according to claim 4, further comprising:
a lower blocking section provided below the liquid crystal layer and configured to at least partially block a portion of the transmitting light which portion is not concentrated on the first optical axis or the second optical axis.

18. The liquid crystal display module according to claim 4, further comprising:
a blocking layer provided at such a position between the liquid crystal layer and the color display section as not to prevent the transmitting light from being concentrated to the at least one light-emitting region in the displaying state.

19. The liquid crystal display module according to claim 4, wherein
the at least one light-emitting region contains a quantum-dot phosphor.

20. The liquid crystal display module according to claim 4, further comprising:
a light-transmitting dielectric layer, wherein
the color display section is between the second substrate and the liquid crystal layer, and
the light-transmitting dielectric layer is between the color display section and the liquid crystal layer.

21. A liquid crystal display device, comprising:
a liquid crystal display module according to claim 4; and
a light source section configured to emit backlight traveling from below the first substrate toward the liquid crystal layer.

22. The liquid crystal display device according to claim 4, wherein
the backlight is parallel light.

\* \* \* \* \*